United States Patent [19]

Moriguchi et al.

[11] Patent Number: 5,736,017
[45] Date of Patent: Apr. 7, 1998

[54] SOLID HIGH POLYMER ELECTROLYTIC MODULE AND METHOD OF MANUFACTURING THE SAME

[75] Inventors: Tetsuo Moriguchi, Tokyo; Yoshiharu Takeuchi, Hyogo, both of Japan

[73] Assignee: Mitsubishi Denki Kabushiki Kaisha, Tokyo, Japan

[21] Appl. No.: 775,626

[22] Filed: Jan. 2, 1997

[30] Foreign Application Priority Data

May 15, 1996 [JP] Japan ................... 8-120540
Aug. 30, 1996 [JP] Japan ................... 8-230413

[51] Int. Cl.⁶ ................................................ C25B 9/00
[52] U.S. Cl. ................... 204/253; 204/257; 204/258; 204/283
[58] Field of Search ........................ 204/282, 253, 204/257, 258

[56] References Cited

U.S. PATENT DOCUMENTS

| | | | |
|---|---|---|---|
| 1,815,078 | 7/1931 | Smith | 204/253 |
| 1,856,663 | 8/1932 | Smith | 204/253 |
| 3,980,544 | 9/1976 | Adams et al. | 204/253 |
| 4,339,324 | 7/1982 | Haas | 204/257 |
| 4,537,672 | 8/1985 | Brereton | 204/253 |
| 5,181,995 | 1/1993 | Kummer | 204/253 |
| 5,384,208 | 1/1995 | Brand et al. | 204/253 |

FOREIGN PATENT DOCUMENTS 61-216714  9/1986  Japan.
8-134679  5/1996  Japan.

*Primary Examiner*—Bruce F. Bell
*Attorney, Agent, or Firm*—Burns, Doane, Swecker & Mathis, LLP

[57] ABSTRACT

This invention has as its object to obtain a compact solid high polymer electrolytic module having a large electrolytic reaction capacity. An electrolytic membrane (20) is constituted in such a manner that strip-shaped anodes (23) and strip-shaped cathodes (22) are formed at a predetermined interval opposite to each other on both the surfaces of a belt-shaped solid high polymer electrolytic membrane (21). A frame (30) is constituted in such a manner that feeding terminals (33a, 33b) are formed on a pair of side edges (31a, 31b) of a frame member (31) having an opening (32) on one side. A plurality of frames (30) are stacked such that the openings (32) alternately face upward and downward. The electrolytic membrane (20) is folded at counter edges (31c) of the frames (30) and held between the adjacent frames (30), thereby constituting a stereoscopically corrugated structure in a stacking direction of the frames (30).

15 Claims, 17 Drawing Sheets

——— : STEAM PASSAGE
- - - - - - - : OXYGEN PASSAGE

——————— : STEAM PASSAGE
------------- : OXYGEN PASSAGE

SOLID HIGH POLYMER ELECTROLYTIC MODULE AND METHOD OF MANUFACTURING THE SAME

BACKGROUND OF THE INVENTION

1. Field of the Invention

The present invention relates to a solid high polymer electrolytic module which uses a solid high polymer electrolytic membrane having conductivity with respect to hydrogen ions and hydroxide ions and formed to have a three-dimensional structure, and a method of manufacturing the solid high polymer electrolytic module.

2. Description of the Related Art

FIG. 23 is a view showing the structure of a conventional solid high polymer electrolytic module using a solid high polymer electrolytic membrane having conductivity with respect to hydrogen ions, for example, described in Japanese Patent Laid-Open No. 61-216714.

Referring to FIG. 23, a cathode 2 is bonded to one surface of a cation exchange film 1 consisting of a solid high polymer electrolytic membrane having hydrogen ion conductivity by a hot press method, and a anode 3 is bonded to the other surface of the cation exchanger film 1 by an electroless plating method, thereby constituting an electrochemical cell.

As the solid high polymer electrolytic membrane having a hydroxide ion conductivity, for example, a NAFION (registered tradename) membrane available from Du Pont is used.

A cathode current collector 4 is arranged on the rear side of the cathode 2, and an anode current collector 5 is arranged on the rear surface of the anode 3. A cathode terminal plate 6 is arranged on the rear surface of the cathode current collector 4, and an anode terminal plate 7 is arranged on the rear surface of the anode current collector 5. The respective constituent elements 1 to 7 are fixed by a frame 8.

An air to be dehumidified is supplied by a pump 9 into a cathode chamber 10 formed in the gap portion of the cathode current collector 4 and an anode chamber 11 formed in the gap portion of the anode current collector 5 to cause the cation exchange film 1 to absorb steam in the air supplied into both the chambers 10 and 11.

In this state, when a DC voltage is applied across both the terminal plates 6 and 7, electrolytic reduction of oxygen occurs on the cathode 2, generation of oxygen occurs on the anode 3, and water leaks from the rear surface of the cathode 2. The leakage water is reserved in a water tank 12, and an excessive gas deoxidized by the cathode 2 is discharged from an exhaust port 13 in the atmospheric air. Oxygen generated by the anode 3 is discharged from an exhaust port 14 in the atmospheric air together with the excessive air.

An operation principle of the electrochemical cell obtained by bonding the cation exchange film 1 to both the electrodes 2 and 3 will be described below.

Referring to FIG. 23, when a DC power supply (not shown) applies a voltage across both the electrodes 2 and 3, water is decomposed on the anode 3, and a humidity in the anode chamber 11 decreases due to reaction expressed by formula (1):

$$2H_2O \rightarrow O_2 + 4H^+ + 4e^- \tag{1}$$

At this time, hydrogen ions ($H^+$) pass through the cation exchange film 1 to reach the cathode 2. Electrons ($e^-$) pass through the circuit of the DC power supply (not shown) to reach the cathode 2. The cathode 2 consumes oxygen to generate water according to formula (2):

$$O_2 + 4H^+ + 4e^- \rightarrow 2H_2O \tag{2}$$

Further, about three (average) water molecules move from the anode 3 to the cathode 2 together with hydrogen ions ($H^+$). Therefore, the cathode 2 generates water from steam in the anode chamber 11 due to the reaction expressed by formula (2), and water moves from the anode 3 to the cathode 2. For this reason, a humidity in the anode chamber 11 decreases.

A conventional solid high polymer electrolytic module is arranged as described above, a reaction area where a solid high polymer electrolytic membrane is in contact with a surrounding fluid is planarly and two-dimensionally constituted. For this reason, the solid high polymer electrolytic membrane disadvantageously requires a large plane in application in which a high electrolytic load acts.

SUMMARY OF THE INVENTION

The present invention is to provide a solid high polymer electrolytic module in which an electrolytic membrane is stereoscopically constituted to three-dimensionally form an electrolytic membrane at a high density, and a method of manufacturing the module.

In order to achieve the above object, according to one aspect of the present invention, there is provided a solid high polymer electrolytic module comprising an electrolytic membrane in which an anode is formed on one surface of a belt-shaped solid high polymer electrolytic membrane having hydrogen ions or hydroxide ions as conductors in a longitudinal direction and a cathode is formed on the other surface of the solid high polymer electrolytic membrane in the longitudinal direction to be opposite to the anode, a plurality of rectangular frames each constituted by an electric insulator having an opening on one side and stacked such that the openings alternately face upward and downward, and feeders for supplying electricity from a DC power supply to the electrolytic membrane, wherein the electrolytic membrane is folded at counter edges opposing the openings of the frames and causes the anode and cathode formed opposite to each other on both the surfaces of the solid high polymer electrolytic membrane to be held between the adjacent frames, thereby constituting a stereoscopically corrugated structure in a stacking direction of the frames.

In order to achieve the above object, according to another aspect of the present invention, there is provided a solid high polymer electrolytic module comprising an electrolytic membrane in which a plurality of strip-shaped anodes are formed at a predetermined interval on one surface of a belt-shaped solid high polymer electrolytic membrane having hydrogen ions or hydroxide ions as conductors in a longitudinal direction and a plurality of strip-shaped cathodes are formed at a predetermined interval on the other surface of the solid high polymer electrolytic membrane in the longitudinal direction to be opposite to the anodes, a plurality of rectangular frames each constituted by an electric insulator having an opening on one side and stacked such that the openings alternately face upward and downward, and feeders for supplying electricity from a DC power supply to the electrolytic membrane, wherein the electrolytic membrane is folded at counter edges opposing the openings of the frames and causes the anode and cathode formed opposite to each other on both the surfaces of the solid high polymer electrolytic membrane to be held between the adjacent frames, thereby constituting a stereoscopically corrugated structure in a stacking direction of the frames.

According to a further aspect of the present invention, there is provided a solid high polymer electrolytic module comprising a plurality of electrolytic membranes in which strip-shaped anodes and strip-shaped cathodes are formed opposite to each other on both the surfaces of strip-shaped solid high polymer electrolytic membranes having hydrogen ions or hydroxide ions as conductors, a plurality of rectangular frames each constituted by an electric insulator having an opening on one side and stacked such that the openings alternately face upward and downward, and feeders for supplying electricity from a DC power supply to the electrolytic membranes, wherein the plurality of electrolytic membranes are interposed between the frames such that the same poles of the anodes and cathodes are opposite to each other, thereby constituting a stereoscopically corrugated structure in a stacking direction of the frames.

According to a further aspect of the present invention, there is provided a solid high polymer electrolytic module comprising an electrolytic membrane in which a belt-shaped anode is formed on one surface of a belt-shaped solid high polymer electrolytic membrane having hydrogen ions or hydroxide ions as conductors in a longitudinal direction and a plurality of strip-shaped cathodes are formed at a predetermined interval on the other surface of the solid high polymer electrolytic membrane to be opposite to the anode in the longitudinal direction, a plurality of rectangular frames each constituted by an electric insulator having an opening on one side and stacked such that the openings alternately face upward and downward, and feeders for supplying electricity to the electrolytic membrane, wherein the electrolytic membrane is folded at counter edges opposing the openings of the frames and causes the anode and cathodes formed opposite to each other on both the surfaces of the solid high polymer electrolytic membrane to be held between the frames, thereby constituting a stereoscopically corrugated structure in a stacking direction of the frames.

According to a further aspect of the present invention, there is provided a dehumidification apparatus comprising: a solid high polymer electrolytic module in which a plurality of rectangular frames each constituted by an electric insulator having an opening on one side are stacked such that the openings alternately face upward and downward, a belt-shaped electrolytic membrane in which a plurality of strip-shaped anodes and a plurality of strip-shaped cathodes are formed at a predetermined interval opposite to each other on both the surfaces of a belt-shaped solid high polymer electrolytic membrane having hydrogen ions or hydroxide ions as conductors in a longitudinal direction is folded at counter edges opposing the openings of the frames, the anodes and the cathodes formed opposite to each other on both the surfaces of the solid high polymer electrolytic membrane are held between the adjacent frames, the anodes are opposite to each other through each frame, and the cathodes are opposite to each other through each frame, and the belt-shaped electrolytic membrane constitutes a stereoscopically corrugated structure in a stacking direction of the frames; and a housing for storing the solid high polymer electrolytic module, wherein the opening where the anodes are opposite to each other faces upward, the opening where the cathodes are opposite to each other faces downward, the solid high polymer electrolytic module is stored in the housing to partition a space in the housing into upper and lower spaces, inlet ports and exhaust ports are formed in both end portions of the housing in a direction perpendicular to the stacking direction of the frames to respectively communicate with the upper and lower spaces and to form flow passages for fluid along both corrugated wall surfaces of the electrolytic membrane.

According to a further aspect of the present invention, there is provided a dehumidification apparatus comprising: a solid high polymer electrolytic module in which a plurality of rectangular frames each constituted by an electric insulator having an opening on one side are stacked such that the openings alternately face upward and downward, a plurality of electrolytic membranes in which strip-shaped anodes and strip-shaped cathodes are formed opposite to each other on both the surfaces of strip-shaped solid high polymer electrolytic membranes having hydrogen ions and hydroxide ions as conductors are interposed between the adjacent frames such that the same poles of the anodes and cathodes are opposite to each other, thereby constituting a stereoscopically corrugated structure in a stacking direction of the frames; and a housing for storing the solid high polymer electrolytic module, wherein the opening where the anodes are opposite to each other faces downward, the opening where the cathodes are opposite to each other faces upward, the solid high polymer electrolytic module is stored in the housing to partition a space in the housing into upper and lower spaces, inlet ports and exhaust ports are formed in both end portions of the housing in a direction perpendicular to the stacking direction of the frames to respectively communicate with the upper and lower spaces and to form flow passages for fluid along both corrugated wall surfaces of the electrolytic membrane.

According to a further aspect of the present invention, there is provided a dehumidification apparatus comprising: a solid high polymer electrolytic module in which a plurality of rectangular frames each constituted by an electric insulator having an opening on one side are stacked such that the openings alternately face upward and downward, an electrolytic membrane in which a belt-shaped anode is formed on one surface of a belt-shaped solid high polymer electrolytic membrane having hydrogen ions and hydroxide ions as conductors in a longitudinal direction and a plurality of strip-shaped cathodes are formed at a predetermined interval on the other surface of the solid high polymer electrolytic membrane in the longitudinal direction to be opposite to the anode is folded at counter edges opposing the openings of the frames, the anode and the cathodes formed opposite to each other on both the surfaces of the solid high polymer electrolytic membrane are held between the adjacent frames, the anodes are opposite to each other through each frame, the cathodes are opposite to each other through each frame, and the electrolytic membranes constitute a stereoscopically corrugated structure in a stacking direction of the frames; and a housing for storing the solid high polymer electrolytic module, wherein the opening where the anodes are opposite to each other faces downward, the opening where the cathodes are opposite to each other faces upward, the solid high polymer electrolytic module is stored in the housing to partition a space in the housing into upper and lower spaces, inlet ports and exhaust ports are formed in both end portions of the housing in a direction perpendicular to the stacking direction of the frames to respectively communicate with the upper and lower spaces and to form flow passages for fluid along both corrugated wall surfaces of the electrolytic membrane.

According to a further aspect of the present invention, there is provided a method of manufacturing a solid high polymer electrolytic module in which a plurality of rectangular frames each constituted by an electric insulator having an opening on one side are stacked such that the openings alternately face upward and downward, a belt-shaped electrolytic membrane in which strip-shaped anodes and strip-shaped cathodes are formed at a predetermined interval opposite to each other on both the surfaces of a belt-shaped solid high polymer electrolytic membrane having hydrogen ions and hydroxide ions as conductors is folded at counter edges opposing the openings of the frames, the anodes and the cathodes formed opposite to each other on both the surfaces of the solid high polymer electrolytic membrane are held between the adjacent frames, the anodes are opposite to each other through each frame, the cathodes are opposite to each other through each frame, and the electrolytic membrane constitutes a stereoscopically corrugated structure in a stacking direction of the frames, comprising: the step of forming the plurality of strip-shaped anodes at the predetermined interval on one surface of the belt-shaped solid high polymer electrolytic membrane in the longitudinal direction, and forming the plurality of strip-shaped cathodes at a predetermined interval on the other surface of the solid high polymer electrolytic membrane in the longitudinal direction to be opposite to the anodes to form the belt-shaped electrolytic membrane; and the step of holding the electrolytic membrane in the longitudinal direction with a tensile force, alternately pushing the counter edge sides of the frames from an anode side and a cathode side into portions between adjacent electrodes of the electrolytic membrane, and stacking the frames.

According to a further aspect of the present invention, there is provided a method of manufacturing a solid high polymer electrolytic module in which a plurality of rectangular frames each constituted by an electric insulator having an opening on one side are stacked such that the openings alternately face upward and downward, a belt-shaped electrolytic membrane in which strip-shaped anodes and strip-shaped cathodes are formed at a predetermined interval opposite to each other on both the surfaces of a belt-shaped solid high polymer electrolytic membrane having hydrogen ions and hydroxide ions as conductors is folded at counter edges opposing the openings of the frames, the anodes and the cathodes formed opposite to each other on both the surfaces of the solid high polymer electrolytic membrane are held between the adjacent frames, the anodes are opposite to each other through each frame, the cathodes are opposite to each other through each frame, and the electrolytic membrane constitutes a stereoscopically corrugated structure in a stacking direction of the frames, comprising: the step of forming the plurality of strip-shaped anodes at the predetermined interval on one surface of the belt-shaped solid high polymer electrolytic membrane in the longitudinal direction, and forming the plurality of strip-shaped cathodes at a predetermined interval on the other surface of the solid high polymer electrolytic membrane in the longitudinal direction to be opposite to the anodes to form a belt-shaped electrolytic membrane; the step of alternately bonding the frames onto anode surfaces and cathode surfaces such that the openings face one side of the longitudinal direction of the electrolytic membrane; and the step of folding the electrolytic membrane at the counter edges of the frames to stack the frames.

DESCRIPTION OF THE PREFERRED EMBODIMENTS

Embodiments of the present invention will be described below.

Embodiment 1

Figure 1:
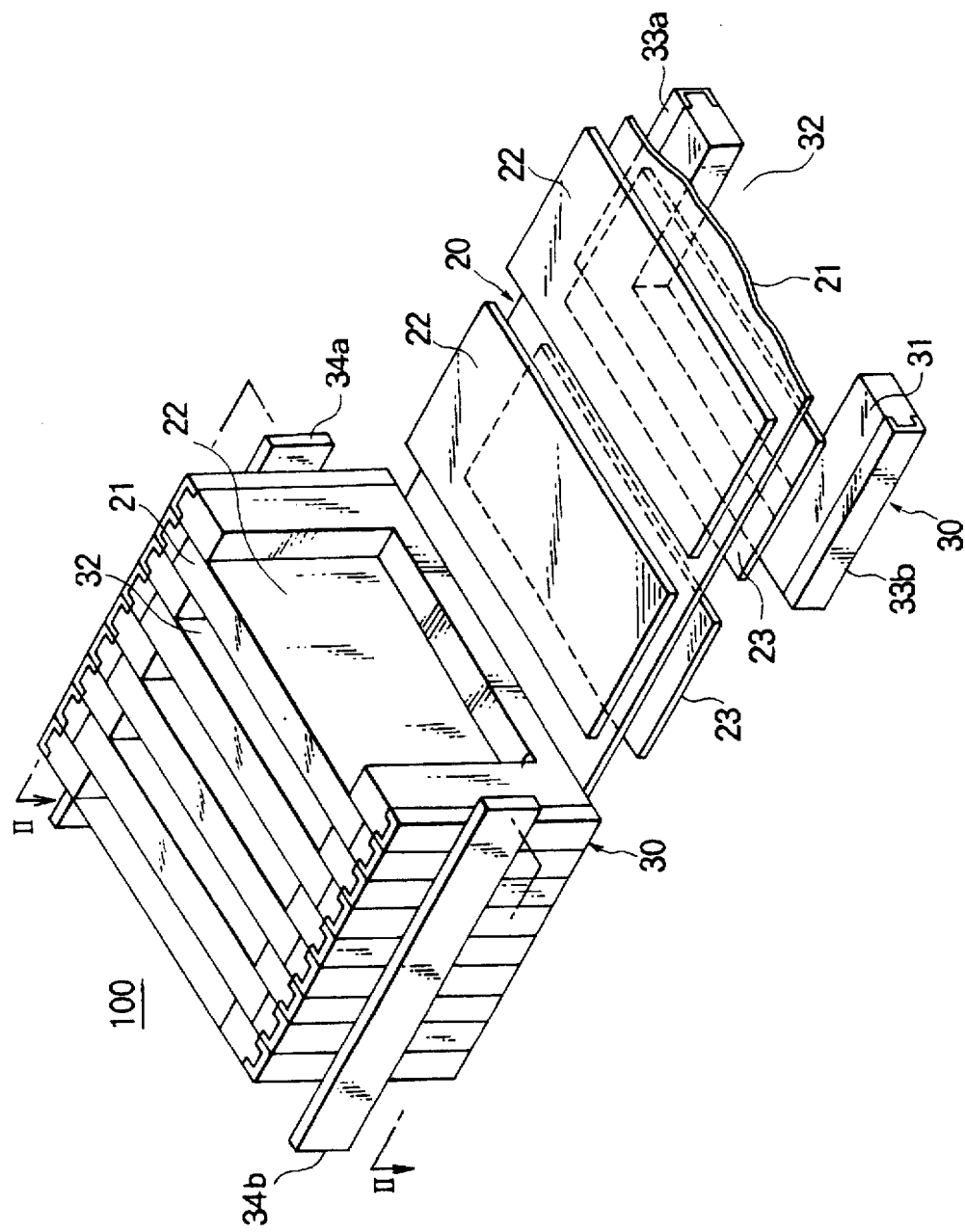
FIG. 1 is a partial assembly diagram showing a solid high polymer electrolytic module according to Embodiment 1 of the present invention.
Figure 2:
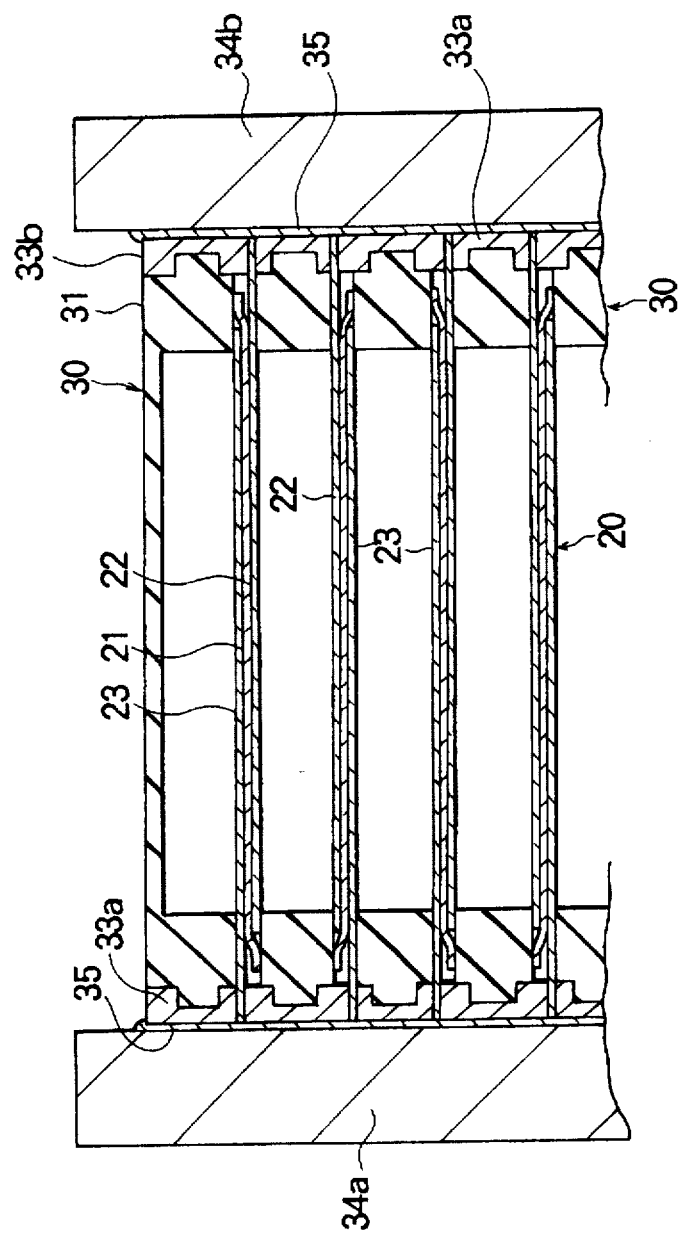
FIG. 2 is a sectional view showing the solid high polymer electrolytic module along a II—II line in FIG. 1.
Figure 3:
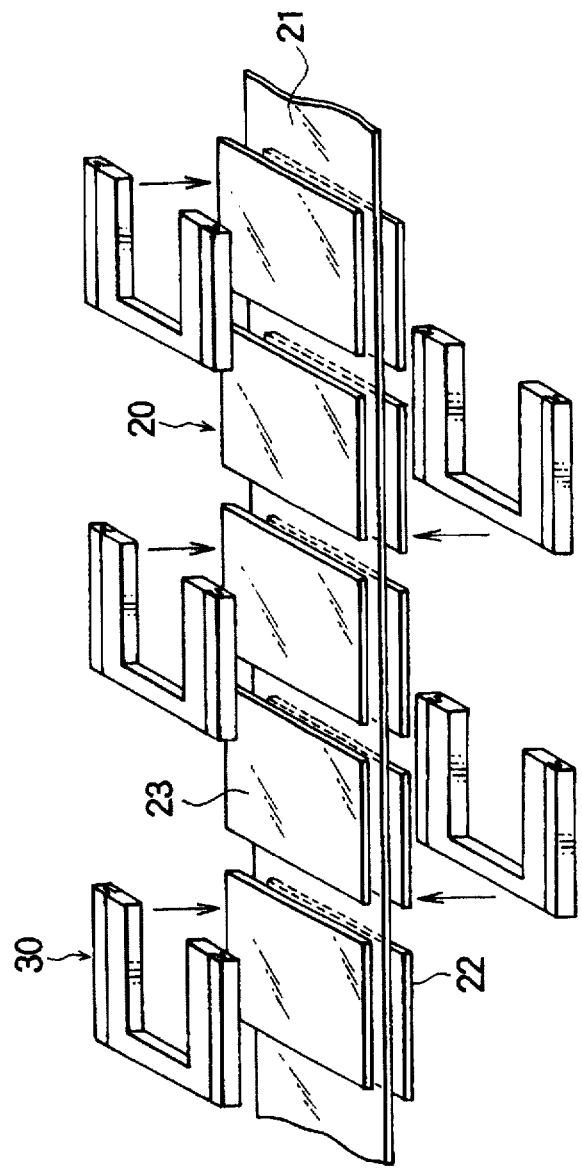
FIG. 3 is a development perspective view showing the solid high polymer electrolytic module according to Embodiment 1 of the present invention.
Figure 4:
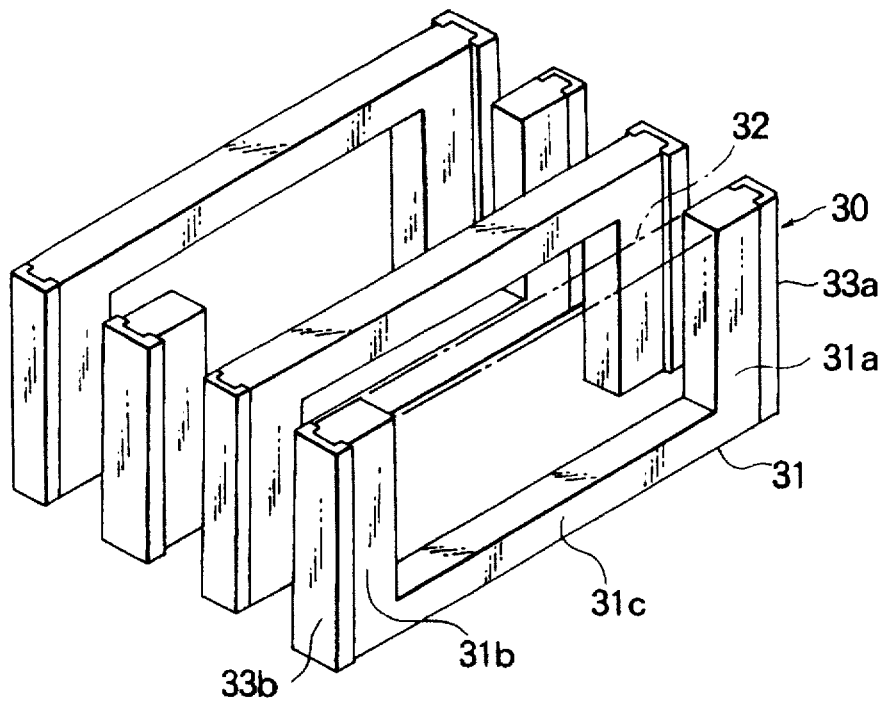
FIG. 4 is a perspective view showing the arrangement of frames of the solid high polymer electrolytic module according to Embodiment 1 of the present invention.

FIG. 1 is a partial assembly diagram showing a solid high polymer electrolytic module according to Embodiment 1 of the present invention, FIG. 2 is a sectional view showing the solid high polymer electrolytic module along a II—II line in FIG. 1, FIG. 3 is a development perspective view showing the solid high polymer electrolytic module according to Embodiment 1 of the present invention, and FIG. 4 is a perspective view showing the arrangement of frames of the solid high polymer electrolytic module according to Embodiment 1 of the present invention.

Referring to FIGS. 1 to 4, an electrolytic membrane 20 is constituted to have a belt-like shape in such a manner that, as shown in FIG. 3, a plurality of strip-shaped cathodes 22 and a plurality of strip-shaped anodes 23 are adhered to both the surfaces of a solid high polymer electrolytic membrane 21 in a line, for example, a NAFION (registered tradename of Du pont) membrane having hydrogen conductivity, and the electrolytic membrane 20 has a function of electrolyzing steam in the air. Although not shown, the cathode 22 and the anode 23 contain a platinum-based metal catalyst, and the cathode 22 and the anode 23 are heat-pressed against the front and rear surfaces of the solid high polymer electrolytic membrane 21 to be adhered thereto. The cathode 22 extends in one of the width directions of the solid high polymer electrolytic membrane 21, and the anode 23 extends in the other of width direction of the solid high polymer electrolytic membrane 21.

A carbon unwoven cloth with which, for example, a platinum-based metal catalyst is mixed is used as the cathode 22, and a titanium mesh member subjected to surface treatment using a platinum-based material such as platinum, iridium, or iridium oxide is used as the anode 23.

A platinum-based metal catalyst is often interposed between the anode 23 and the solid high polymer electrolytic membrane 21. However, when a high electrolyzing rate is not specially demanded, the surface treatment layer of the platinum-based material on the anode 23 is also used as a catalyst layer, so that the platinum-based catalyst layer can be omitted.

A frame 30 is formed to have a U shape where one edge of a rectangular frame member 31 consisting of an insulating material is removed to form an opening 32. Feeding terminals 33a and 33b are attached to the opposing edges 31a and 31b on both the sides of the opening 32. The feeding terminals 33a and 33b are formed to extend from one side surface of the frame member 31 to the other side surface through outer wall surfaces. At this time, the feeding terminal 33a is formed to have substantially the same area as that of the surface of the frame member 31. On the other hand, the feeding terminal 33b is formed to project from the surface of the frame member 31. The frame 30 is manufactured by molding a resin such as an epoxy resin, an acrylic resin, or a vinyl chloride resin. The feeding terminals 33a and 33b may consist of an electrical conductor, for example, copper or stainless steel.

The frames 30 arranged as described above, as shown in FIG. 3, are alternately attached to the belt-shaped electrolytic membrane 20 in directions indicated by arrows. As shown in FIG. 4, the frames 30 are stacked such that the openings 32 alternately have opposite directions.

At this time, two types of frames 30, i.e., a frame 30 in which a projection amount of the feeding terminal 33b is slightly smaller than the total thickness of the cathode 22 and the solid high polymer electrolytic membrane 21, and a frame 30 in which a projection amount of the feeding terminal 33b is slightly smaller than the total thickness of the anode 23 and the solid high polymer electrolytic membrane 21, are used. The frames 30 are arranged to be stacked such that the anode 23 is held between the feeding terminal 33a and the feeding terminal 33b whose projection amount is slightly smaller than the total thickness of the cathode 22 and the solid high polymer electrolytic membrane 21, and the cathode 22 is held between the feeding terminal 33a and the feeding terminal 33b whose projection amount is slightly smaller than the total thickness of the anode 23 and the solid high polymer electrolytic membrane 21.

In this manner, the belt-shaped electrolytic membrane 20 is folded at the outer edge faces of counter edges 31c opposing the openings 32 of the frame members 31 stacked, and a stacked body constituted by the cathode 22, the solid high polymer electrolytic membrane 21, and the anode 23 is held between a pair of frame members 31 in a press-contact state. The end portions of the cathode 22 and the anode 23 projecting in the width directions of the solid high polymer electrolytic membrane 21 are held between a pair of feeding terminals 33a and 33b in a press-contact state, thereby establishing electric connection.

As shown in FIG. 2, the respective cathodes 22 of the electrolytic membrane 20 are electrically connected to feeding terminals on one side of the stacked body of the frames 30, and the respective anodes 23 are electrically connected to feeding terminals on the other side of the stacked body. A feeding bus 34a is arranged on one side of the frames 30, and a feeding bus 34b is arranged on the other side of the frames 30 so that a DC voltage can be applied across the cathodes 22 and the anodes 23 through the feeding terminals 33a and 33b. Conductive dye 35 is coated between the feeding buses 34a and 34b and the feeding terminals 33a and 33b. For this reason, even if a side surface of the stacked body of the frames 30 is made uneven, electric connection between the feeding buses 34a and 34b and the feeding terminals 33a and 33b can be reliably established. At this time, the conductive dye 35 also functions in such a manner that the feeding terminals 33a and 33b are electrically connected to the cathodes 22 and the anodes 23.

Note that conductive dye may be interposed between the feeding terminals 33a and 33b and the cathodes 22 and anodes 23 when the cathodes 22 and the anodes 23 are to be held between the feeding terminals 33a and 33b.

In this manner, a solid high polymer electrolytic module 100 in which spaces each having the upward opening 32 and formed between the opposing cathodes 22 and spaces each having the downward opening 32 and formed between the opposing anodes 23 are alternately formed can be obtained. This solid high polymer electrolytic module 100 is constituted as follows. That is, the electrolytic membrane 20 is folded at counter edges 31c of the frames 30 arranged in such a manner that the openings 32 alternately face upward and downward, and held between a pair of adjacent frames 30 in a press-contact state. Thereby, the electrolytic membrane 20 is formed into a wave shape in the stacking direction of the frames 30. The spaces each formed between the cathodes 22 and the spaces each formed between the anodes 23 are hermetically isolated from each other.

In order to improve the hermetical properties between the space formed between the cathodes 22 and the space formed between the anodes 23, for example, the frames 30 may be stacked through an adhesive having hermetical properties, or the outer edge of the stacked frames 30 may be molded by a sealing material.

Figure 6:
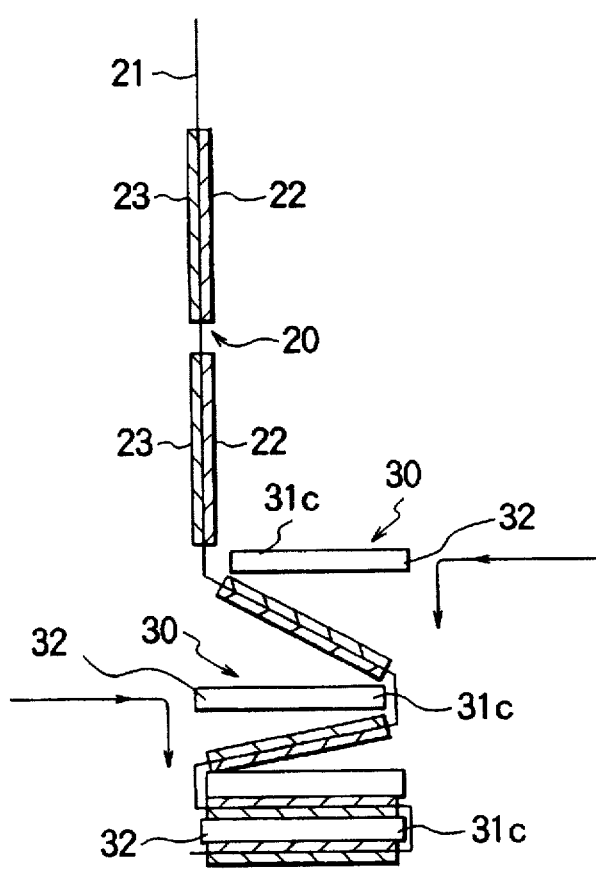
FIG. 6 is a view for explaining a method of manufacturing the solid high polymer electrolytic module according to Embodiment 1 of the present invention.

In this case, a method of manufacturing the solid high polymer electrolytic module 100 arranged described above will be described below with reference to FIG. 6.

A strip-shaped mesh member consisting of platinum-plated titanium extends on one surface of the solid high polymer electrolytic membrane 21 in one of the width directions of the solid high polymer electrolytic membrane 21, and is heat-pressed at a predetermined interval in the longitudinal direction to be bonded to the solid high polymer electrolytic membrane 21. Then, a plurality of anodes 23 extending in one of the width directions are formed on one surface of the solid high polymer electrolytic membrane 21 at a predetermined interval in the longitudinal direction. A carbon unwoven cloth having a strip shape and mixed with a platinum-based metal catalyst extends on the other surface of the solid high polymer electrolytic membrane 21 in the other of the width directions, and is heat-pressed at a predetermined interval opposite to the anodes 23 to be bonded to the solid high polymer electrolytic membrane 21. Then, a plurality of cathodes 22 extending in one of the width directions are formed at a predetermined interval on the other surface of the solid high polymer electrolytic membrane 21 in the longitudinal direction, thereby forming the belt-shaped electrolytic membrane 20.

The belt-shaped electrolytic membrane 20 is held with a tensile force in the longitudinal direction. The counter edge 31c of the frame 30 is pushed from one surface side of the electrolytic membrane 20 into the portion between the adjacent anodes 23. The counter edge 31c of the frame 30 is pushed from the other surface side into the portion between the adjacent cathodes 22. These procedures are repeated to alternately push the counter edges 31c of the frames 30 from the anode and cathode sides into portions between adjacent electrodes of the electrolytic membrane 20, and the frames 30 are stacked in such a manner that the openings 32 alternately face upward and downward. According to the stacking procedure for the frames 30, the electrolytic membrane 20 is folded at the counter edges 31c of the frames 30, held between the adjacent frames 30, and constitutes a stereoscopically corrugated structure in the stacking direction of the frames 30. The cathodes 22 of the electrolytic membrane 20 are electrically connected to the feeding terminals on one side of the stacking body of the frames 30, and the anodes 23 are electrically connected to the feeding terminals on the other side of the stacked body of the frames 30.

Thereafter, the feeding bus 34a is arranged on one side of the frames 30, and the feeding bus 34b is arranged on the other side, thereby assembling the solid high polymer electrolytic module 100.

The action of the solid high polymer electrolytic module 100 according to Embodiment 1 of the present invention will be described below with reference to FIG. 5.

In the solid high polymer electrolytic module 100, the electrolytic membrane 20 which is arranged to be folded in a zigzag form by the frames 30 causes the counter edges 31c of the frames 30 to form and maintain the wave shape of the membrane, thereby forming a space A on the cathode 22 side and a space B on the anode 23 side.

The space A faces the upward openings 32 of the solid high polymer electrolytic module 100, and the space B faces the downward openings 32 of the solid high polymer electrolytic module 100. The space A faces all the cathodes 22 of the electrolytic membrane 20, and the space B faces all the anodes 23 of the electrolytic membrane 20.

Although not shown, a voltage is applied from a DC power supply across the cathodes 22 and the anodes 23 through the feeding buses 34a and 34b and the feeding terminals 33a and 33b. When the voltage is applied across both the electrodes, a current flows in the electrolytic membrane 20, and electrolytic reaction based on the following formulas takes place on the anode 23 side and the cathode 22 side. Steam on the anode 23 side is electrolyzed to generate oxygen. In contrast to this, oxygen is consumed on the cathode 22 side to generate steam. More specifically, the steam on the anode 23 side apparently moves to the cathode 22 side, and the oxygen on the cathode 22 side apparently moves to the anode 23 side.

Anode side: $H_2O \rightarrow 2H^+ + 1/2O_2 + 2e^-$

Cathode side: $2H^+ + 1/2O_2 + 2e^- \rightarrow H_2O$

As a whole : $H_2O$ (anode side) $\rightarrow H_2O$ (cathode side)
$O_2$ (cathode side) $\rightarrow O_2$ (anode side)

For this reason, steam moves upward along a solid arrow because the space B faces the anodes 23. When the steam reaches the surfaces of the anodes 23, electrolysis occurs to produce oxygen. The produced oxygen moves downward along a dotted arrow to flow into the space B. On the other hand, oxygen moves downward along a dotted arrow because the space A faces the cathodes 22. When the oxygen reaches the surfaces of the cathodes 22, the oxygen reacts with hydrogen ions conducting through the electrolytic membrane 20 to produce steam. The produced steam moves upward along a solid arrow to flow into the space A. In this manner, the space B is dehumidified and becomes an environment rich in oxygen, and the space A is humidified and becomes an environment poor in oxygen.

Use of this phenomenon makes it possible to control the humidity of the spaces.

Figure 5:
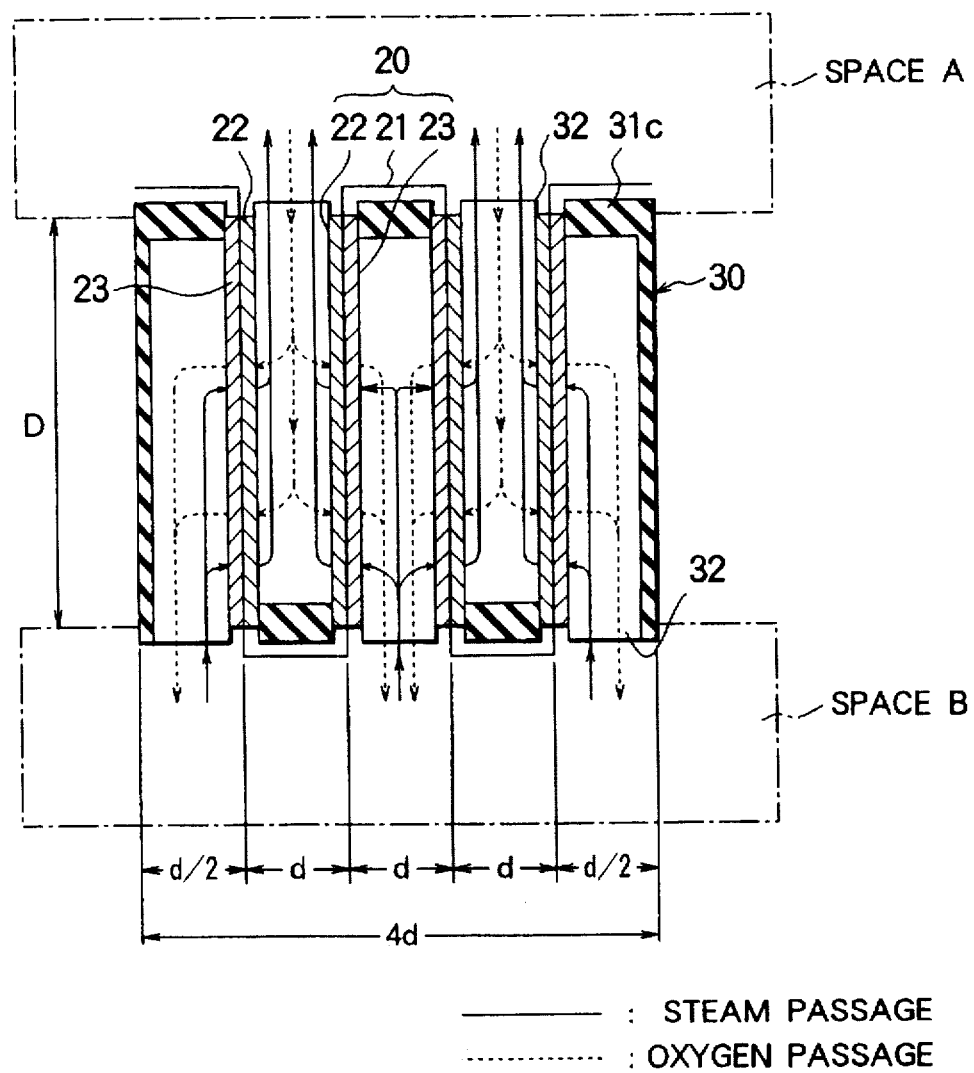
FIG. 5 is a view for explaining an operation of the solid high polymer electrolytic module according to Embodiment 1 of the present invention.

In this case, referring to FIG. 5, when the height and thickness of each frame 30 are represented by D and d, respectively, the width of the electrolytic surface of the electrolytic membrane 20 is represented by 4D when the electrolytic membrane 20 is formed into a planar shape. On the other hand, in Embodiment 1, since the electrolytic membrane 20 is stereoscopically formed into a wave shape, the width of the electrolytic surface is represented by 4d. Therefore, the reduction rate of the width of the module is d/D.

As a example, assume that D is set to 100 mm and that d is set to 5 mm. In this case, when the electrolytic membrane 20 is stereoscopically arranged to form a module, the module width can be reduced to 5/100, i.e., 1/20.

In this manner, when the electrolytic membrane 20 are arranged to be folded into a wave shape by the frames 30 so as to form the space A on the cathode 22 side and the space B on the anode 23 side, a flow passage for a fluid is formed by the thicknesses of the frames 30. However, when the thickness of the frames 30 is minimized within the range in which the flow of fluid can be performed, the electrolytic membrane 20 can be arranged at a high density, and a large electrolytic area can be formed in a small space.

As described above, according to Embodiment 1, the plurality of frames 30 are stacked in such a manner that the openings 32 alternately face upward and downward, the electrolytic membrane 20 is folded at the counter edges 31c of the frames 30, and the cathodes 22, the solid high polymer electrolytic membrane 21 and the anodes 23 are held between the adjacent frames 30 to form a stereoscopically corrugated structure in the stacking direction of the frames 30. For this reason, the electrolytic membrane 20 can be three-dimensionally formed at a high density, and a large electrolytic area can be formed in a small space, thereby achieving a compact solid high polymer electrolytic module 100 having a large capacity.

Further, since the cathode 22, the solid high polymer electrolytic membrane 21 and the anode 23 are held between adjacent frames 30 in a press-contact state, a fluid stands at portions near the feeding terminals 33a and 33b, and a reaction product such as oxygen produced on an electrolytic reaction surface does not easily reach the feeding terminals 33a and 33b. Therefore, corrosion of the feeding terminals 33a and 33b due to nascent oxygen is structurally suppressed, and a metal material such as copper or stainless steel can be used as the material of the feeding terminals 33a and 33b, thereby designing a module at a low cost.

The feeding terminals 33a and 33b are formed from one surface side of each frame member 31 to the other surface side through the outer wall surfaces, the anodes 23 extend in one of the width directions of the solid high polymer electrolytic membrane 21, and the cathodes 22 extend in the other of the width directions of the solid high polymer electrolytic membrane 21. The end portions of the anodes 23 and the cathodes 22 in the extending direction are held between the feeding terminals 33a and 33b of the adjacent frames 30 to establish electric connection. For this reason, a special member for electrically connecting the electrodes to the feeding terminals 33a and 33b is not necessary, the number of parts can be reduced, and the structure can be simplified, thereby achieving low cost and high productivity.

Two types of frames 30, i.e., a frame 30 in which the projection amount of the feeding terminal 33b is slightly smaller than the total thickness of the cathode 22 and the solid high polymer electrolytic membrane 21 and a frame 30 in which the projection amount of the feeding terminal 33b is slightly smaller than the total thickness of the anode 23 and the solid high polymer electrolytic membrane 21, are used. The anode 23 is held between the feeding terminal 33a and the feeding terminal 33b whose projection amount is slightly smaller than the total thickness of the cathode 22 and the solid high polymer electrolytic membrane 21, and the cathode 22 is held between the feeding terminal 33a and the feeding terminal 33b whose projection amount is slightly smaller than the total thickness of the anode 23 and the solid high polymer electrolytic membrane 21. Therefore, the cathode 22, the solid high polymer electrolytic membrane 21 and the anode 23 can be held between the adjacent frames 30 in a press-contact state, and a reaction product produced on the electrolytic reaction surface can be prevented from easily reaching the feeding terminals 33a and 33b.

The cathodes 22 of the electrolytic membrane 20 are electrically connected to the feeding terminals on one side of the stacked body of the frames 30, and the anodes 23 are electrically connected to the feeding terminals on the other side of the stacked body of the frames 30. For this reason, a feeding system for the cathodes 22 and the anodes 23 of the electrolytic membrane 20 can be easily constituted.

Furthermore, the feeding buses 34a and 34b are arranged along both the side surfaces of the stacked frames 30, and the feeding buses 34a and 34b are electrically connected to the feeding terminals on both the sides of the stacked body of the frames 30. For this reason, electrochemical cells obtained by holding the solid high polymer electrolytic membrane 21 between the plurality of cathodes 22 and the plurality of anodes 3 formed in the longitudinal direction of the electrolytic membrane 20 are electrically parallelly arranged between the feeding buses 34a and 34b. Therefore, power is equally supplied to the respective electrochemical cells, an unbalance electrolytic reaction between electrochemical cells is suppressed, thereby stabilizing the operation of the module.

Since each of the frame members 31 of the frames 30 is formed to have a U shape obtained by removing one edge from a rectangular shape, the frame member 31 can be easily manufactured by injection molding, and low cost can be achieved.

Since the anodes 23 are constituted by a mesh member consisting of titanium subjected to surface treatment using a platinum-based metal, the anodes 23 are not corroded by nascent oxygen generated by the anodes 23, and long life of the module can be achieved.

The plurality of strip-shaped anodes 23 are formed at a predetermined interval on one surface of the solid high polymer electrolytic membrane 21 in the longitudinal direction, and the plurality of strip-shaped cathodes 22 are formed at a predetermined interval on the other surface of the solid high polymer electrolytic membrane 21 in the longitudinal direction, thereby forming the belt-shaped electrolytic membrane 20. The belt-shaped electrolytic membrane 20 is held with a tensile force in the longitudinal direction, the counter edge 31c sides of the frames 30 are alternately pushed from the anode and cathode sides into portions between the adjacent electrodes of the electrolytic membrane 20, so that the frames 30 are stacked in such a manner that the openings 32 alternately face upward and downward. For this reason, according to the stacking procedure of the frames 30, the electrolytic membrane 20 is folded at the counter edges 31c of the frames 30 and held between the adjacent frames 30 to form a stereoscopically corrugated structure in the stacking direction of the frames 30. Therefore, the solid high polymer electrolytic module 100 comprising the electrolytic membrane 20 having the stereoscopic corrugated structure can be assembled by an automatic line, and the productivity can be improved.

Embodiment 2

FIGS. 7A to 7D are sectional views showing the steps in manufacturing a solid high polymer electrolytic module according to Embodiment 2 of the present invention.

A method of manufacturing the solid high polymer electrolytic module according to Embodiment 2 of the present invention will be described here.

A strip-shaped mesh member consisting of platinum-plated titanium extends on one surface of a solid high polymer electrolytic membrane 21 in one of the width directions, and is heat-pressed at a predetermined interval in the longitudinal direction to be bonded to the solid high polymer electrolytic membrane 21. Then, a plurality of anodes 23 extending one of the width directions are formed at a predetermined interval on one surface of the solid high polymer electrolytic membrane 21 in the longitudinal direction. A strip-shaped carbon unwoven cloth mixed with, i.e., a platinum-based metal catalyst extends on the other surface of the solid high polymer electrolytic membrane 21 in the other of the width directions, and is heat-pressed at a predetermined interval opposite to the anodes 23 to be bonded to the solid high polymer electrolytic membrane 21. Then, a plurality of cathodes 22 extending in one of the width directions are formed at a predetermined interval on the other surface of the solid high polymer electrolytic membrane 21, thereby forming a belt-shaped electrolytic membrane 20.

Figure 7A:
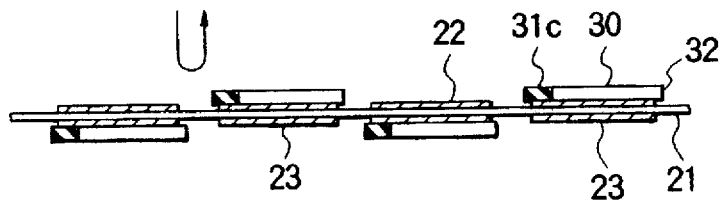
FIGS. 7A to 7D are sectional views for explaining the steps in manufacturing a solid high polymer electrolytic module according to Embodiment 2 of the present invention.

As shown in FIG. 7A, frames 30 are alternately bonded onto the anodes 23 and the cathodes 22 in such a manner that openings 32 face one side in the longitudinal direction of the electrolytic membrane 20.

Figure 7B:
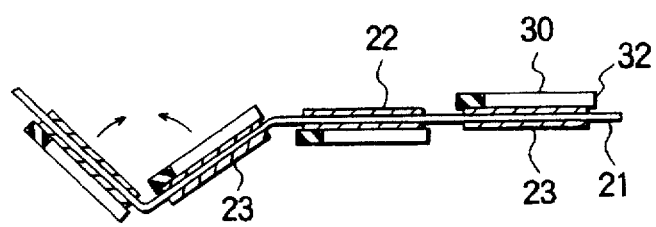
Figure 7C:
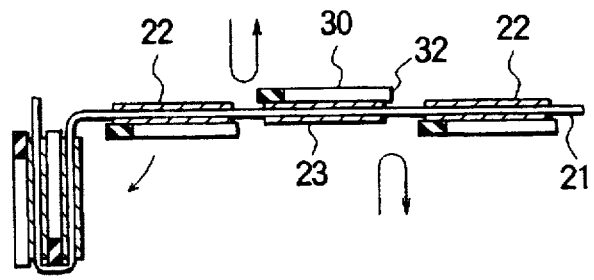

As shown in FIG. 7B, the electrolytic membrane 20 is folded at counter edges 31c of the frames 30 in such a manner that adjacent cathodes 22 are opposite to each other. At last, as shown in FIG. 7C, the electrolytic membrane 20 is held between the frames 30.

Subsequently, the electrolytic membrane 20 is folded at the counter edges 31c of the frames 30 in such a manner that the adjacent anodes 23 are opposite to each other.

Figure 7D:
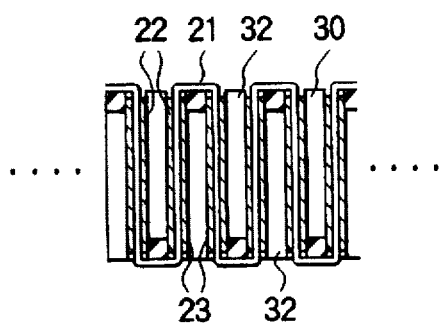

The electrolytic membrane 20 is folded at the counter edges 31c of the frames 30, and, as shown in FIG. 7D, the frames 30 are stacked in such a manner that the openings 32 alternately face opposite sides.

According to the stacking procedure of the frames 30, the electrolytic membrane 20 is folded at the counter edges 31c of the frames 30 and held between the adjacent frames 30 to form a stereoscopically corrugated structure in the stacking direction of the frames 30. The cathodes 22 of the electrolytic membrane 20 are electrically connected to the feeding terminals on one side of the stacked body of the frames 30, and the anodes 23 are electrically connected to the feeding terminals on the other side of the stacked body of the frames 30.

Thereafter, a feeding bus 34a is arranged on one side of the frames 30, and a feeding bus 34b is arranged on the other side, thereby assembling a solid high polymer electrolytic module 100.

Therefore, as in Embodiment 2, the solid high polymer electrolytic module 100 arranged in the same manner as that in Embodiment 1 can be assembled by an automatic line or a semi-automatic line, and the productivity can be improved.

Embodiment 3

Figure 8:
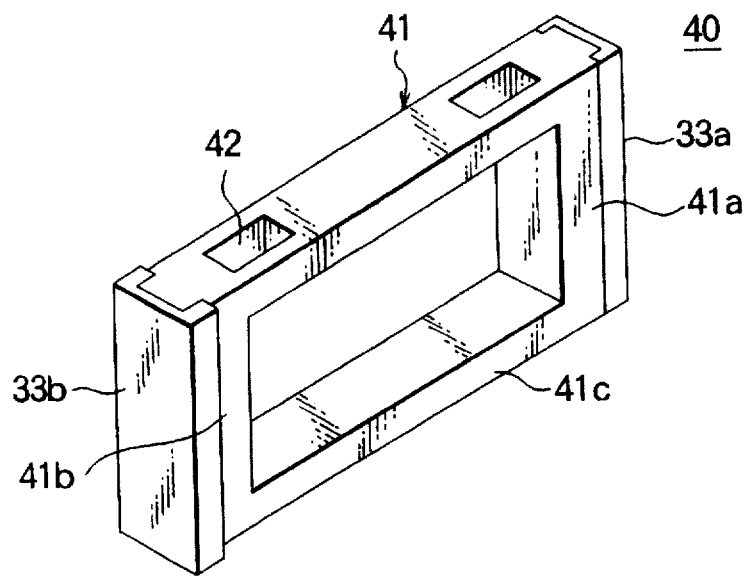
FIG. 8 is a perspective view showing a frame of a solid high polymer electrolytic module according to Embodiment 3 of the present invention.

FIG. 8 is a perspective view showing the structure of a frame used in a solid high polymer electrolytic module according to Embodiment 3 of the present invention.

Referring to FIG. 8, a frame 40 is constituted in such a manner that through holes 42 are formed as openings in one edge of a rectangular frame member 41, and feeding terminals 33a and 33b are formed on a pair of edges 41a and 41b on both the sides of the edge having the through holes 42. An edge opposing the edge having the through holes 42 constitutes a counter edge 41c.

According to Embodiment 3, the frame 40 is used in place of the frame 30 in the solid high polymer electrolytic module 100 of Embodiment 1 described above.

Therefore, in Embodiment 3, the same effect as in Embodiment described above can be obtained.

Since the through holes 42 are formed in the edge of the frame 40 to constitute openings, mechanical strength higher than that of the frame 30 in which the opening 32 is formed by removing one edge can be obtained. For this reason, in an application that a high pressure acts on the cathode or anode side, the frame 40 functions as a pressure support structure, and a solid high polymer electrolytic module having high strength can be obtained.

When a plurality of frames 40 are stacked, the four sides of an electrolytic membrane 20 can be held by the frames 40 in a press-contact state, and the space on the cathode side and the space on the anode side can be reliably shielded from each other.

Embodiment 4

Figure 9:
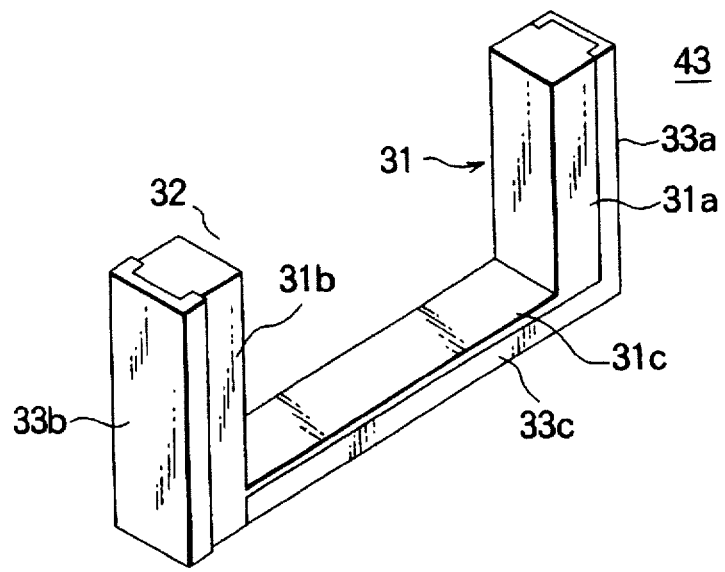
FIG. 9 is a perspective view showing a frame of a solid high polymer electrolytic module according to Embodiment 4 of the present invention.

FIG. 9 is a perspective view showing a frame used in a solid high polymer electrolytic module according to Embodiment 4 of the present invention.

Referring to FIG. 9, in a frame 43, an auxiliary feeding terminal 33c is formed on a counter edge 31c of a frame member 31. The auxiliary feeding terminal 33c is formed at a surface position which is almost the same as that of the frame member 31, and is electrically connected to a feeding terminal 33a. The frame 43 is arranged in the same manner as that of the frame 30 except that the auxiliary feeding terminal 33c is formed. In Embodiment 4, the frame 43 is used in place of the frame 30 in the solid high polymer electrolytic module 100 of Embodiment 1 described above.

When a cathode 22 consists of a carbon unwoven cloth, the electric conductivity of the carbon unwoven material itself is low. For this reason, when a power is supplied from only one end of the strip-shaped cathode 22, voltage drop on the other end increases, and electrolytic efficiency may decrease.

However, in Embodiment 4, when the cathode 22 is brought into contact with the counter edge 31c, the cathode 22 is brought into contact with the auxiliary feeding terminal 33c. Therefore, a power can be supplied from two sides of the cathode 22, and voltage drop of the cathode 22 in an electrode surface direction is suppressed, thereby suppressing a decrease in electrolytic efficiency.

Figure 10:
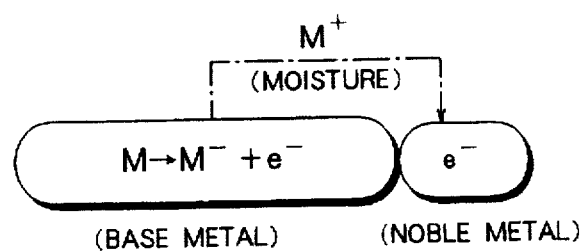
FIG. 10 is a view for explaining local battery formation.

In this case, in a state wherein a base metal and a noble metal electrochemically include water, as shown in FIG. 10, these metals form a local battery to elute the base metal, thereby causing a corrosion phenomenon. Since a platinum-based metal is used as a catalyst in the cathode 22, when moisture is present around the auxiliary feeding terminal 33c, the auxiliary feeding terminal 33c may be corroded by the above phenomenon. For this reason, the auxiliary feeding terminal 33c is preferably formed by using a carbon material free from corrosion phenomenon. For example, a carbon material or a metal whose surface is covered with a carbon film is used.

In Embodiment 4 described above, although the auxiliary feeding terminal 33c is only used on the cathode 22 side, the anode 23 has high electric conductivity because the anode 23 is constituted by a titanium mesh member. Even if a power is supplied from one end of the strip-shaped anode 23, voltage drop does not occur on the other end, and electrolytic efficiency does not decrease.

However, for example, when the area of the anode 23 increases to cause voltage drop, and the auxiliary feeding terminal 33c must be arranged, the electrode material must be considered. More specifically, the anode 23 cannot consist of a carbon-based material because oxygen is generated by the anode 23, and an electrode material which is not corroded by nascent oxygen, for example, a platinum-plated metal material must be used.

Embodiment 5

Figure 11:
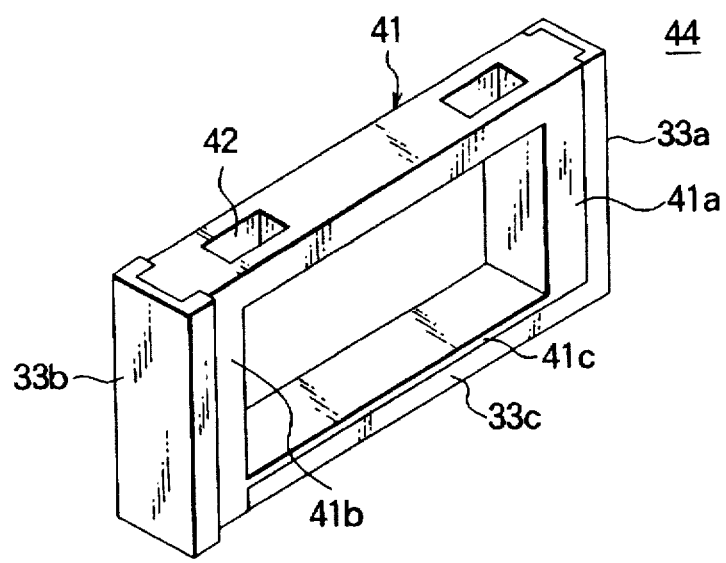
FIG. 11 is a perspective view showing a frame of a solid high polymer electrolytic module according to Embodiment 5 of the present invention.

FIG. 11 is a perspective view showing the structure of frame used in a solid high polymer electrolytic module according to Embodiment 5 of the present invention.

Referring to FIG. 11, in a frame 44, an auxiliary feeding terminal 33c is formed on a counter edge 41c of a frame member 41. The auxiliary feeding terminal 33c is formed at a surface position which is almost the same as that of the frame member 41, and is electrically connected to a feeding terminal 33a. The frame 44 is arranged in the same manner as that of the frame 40 except that the auxiliary feeding terminal 33c is formed. In Embodiment 5, the frame 44 is used in place of the frame 30 in the solid high polymer electrolytic module 100 of Embodiment 1 described above.

For this reason, in Embodiment 5, when a cathode 22 is brought into contact with the counter edge 41c, the cathode 22 is brought into contact with the auxiliary feeding terminal 33c. Therefore, a power can be supplied from two sides of the cathode 22, and, as in Embodiment 4 described above, voltage drop of the cathode 22 in an electrode surface direction is suppressed, thereby suppressing a decrease in electrolytic efficiency.

Embodiment 6

Figure 12:
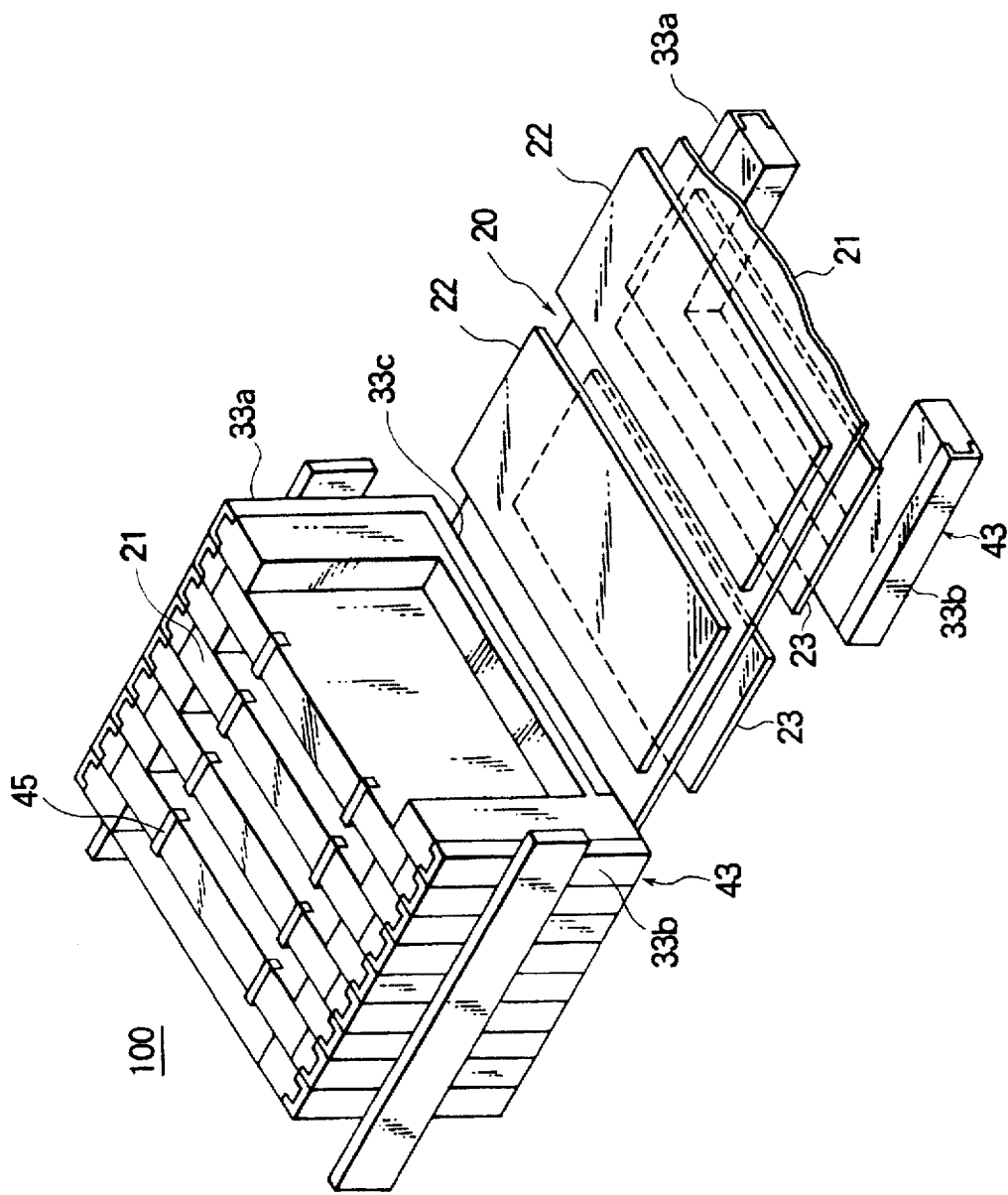
FIG. 12 is a perspective view showing a frame of a solid high polymer electrolytic module according to Embodiment 6 of the present invention.

FIG. 12 is a partial assembly diagram showing a solid high polymer electrolytic module according to Embodiment 6 of the present invention.

According to Embodiment 6, in the solid high polymer electrolytic module 100 according to Embodiment 1 described above, a frame 43 is used in place of the frame 30, and an elastic member 45 is fitted on a counter edge 31c of the frame 43 through a solid high polymer electrolytic membrane 21.

In Embodiment 6, the cathode 22 is pressed against an auxiliary feeding terminal 33c by the elastic force of the elastic member 45 to set a close contact state. Therefore, the contact resistance between the cathode 22 and the auxiliary feeding terminal 33c can be decreased, voltage drop at the contact portion is suppressed, and a sufficient power can be supplied to the cathode 22.

Embodiment 7

Figure 13:
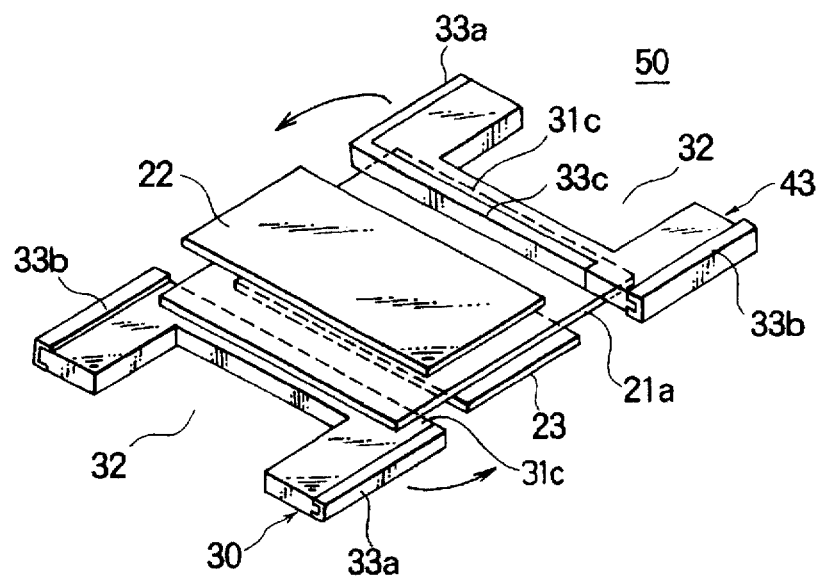
FIG. 13 is a perspective view showing a unit structure of a solid high polymer electrolytic module according to Embodiment 7 of the present invention.
Figure 14:
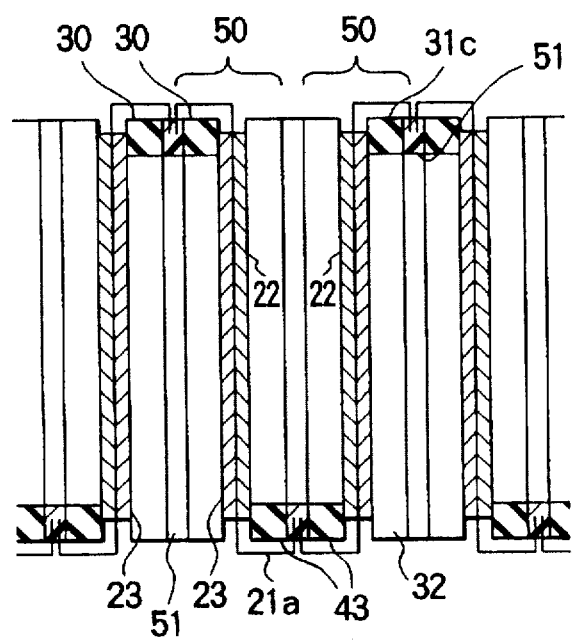
FIG. 14 is a sectional view showing the solid high polymer electrolytic module according to Embodiment 7 of the present invention.

FIG. 13 is a perspective view showing a unit structure of a solid high polymer electrolytic module according to Embodiment 7 of the present invention, FIG. 14 is a sectional view showing the solid high polymer electrolytic module according to Embodiment 7 of the present invention.

The unit 50 is constituted in the following manner. That is, as shown in FIG. 13, a pair of cathode 22 and anode 23 are bonded opposite to each other to both the surfaces of a strip-shaped solid high polymer electrolytic membrane 21a, a counter edge 31c of a frame 43 is bonded to one end of the solid high polymer electrolytic membrane 21a, and a counter edge 31c of a frame 30 is bonded to the other end of the solid high polymer electrolytic membrane 21a. The cathode 22 extends on one side of the solid high polymer electrolytic membrane 21a, and the anode 23 extends on the other side of the solid high polymer electrolytic membrane 21a.

In this unit 50, the frames 30 and 43 are folded in such a manner that the counter edges 31c are attached to the solid high polymer electrolytic membrane 21a, and the solid high polymer electrolytic membrane 21a on which the cathode 22 and the anode 23 are formed are held between the frames 30 and 43. A plurality of units 50 arranged as described above, as shown in FIG. 14, are connected in series with each other such that the cathode 22 side and the anode 23 side respectively face corresponding sides, and the adjacent frames are bonded to each other with an adhesive 51.

In the solid high polymer electrolytic module arranged described above, the cathodes 22 are opposite to each other through a pair of frames 43 bonded to each other with the adhesive 51, and the anodes 23 are opposite to each other through a pair of frames 30 bonded to each other with the adhesive 51. Adjacent solid high polymer electrolytic membranes 21a are coupled to each other with the adhesive 51 between the counter edges 31c of a pair of frames 43 or between the counter edges 31c of a pair of frames 30, and the electrolytic membrane apparently forms a stereoscopically corrugated structure in the stacking direction of the frames.

Therefore, as in Embodiment 7, the same effect as that of Embodiment 1 described above can be obtained.

In Embodiment 7, a belt-shaped electrolytic membrane is divided into strip-shaped solid high polymer electrolytic membranes 21a, and the cathode 22 and the anode 23 are heat-pressed on each solid high polymer electrolytic membrane 21a. For this reason, the electrolytic membranes can be manufactured by a small heat-pressing surface, and a decrease in equipment scale can be achieved.

Embodiment 8

In Embodiment 1, the plurality of strip-shaped cathodes 22 and the plurality of strip-shaped anodes 23 are bonded opposite to each other to both the surfaces of the belt-shaped solid high polymer electrolytic membrane 21 in a line, thereby constituting the belt-shaped electrolytic membrane 20. However, in Embodiment 8, a belt-shaped anode 23 is bonded to one surface of a belt-shaped solid high polymer electrolytic membrane 21, and a plurality of strip-shaped cathodes 22 are bonded to the other surface in a line, thereby constituting a belt-shaped electrolytic membrane.

In this case, the anodes 23 is folded at counter edges 31c of frames 30 together with the solid high polymer electrolytic membrane 21 to form a stereoscopically corrugated structure in the stacking direction of the frames 30.

Therefore, in Embodiment 8, the same effect as that of Embodiment 1 can be obtained.

In Embodiment 1, the plurality of strip-shaped anodes 23 must be heat-pressed on the solid high polymer electrolytic membrane 21, the step of bonding the anodes 23 becomes cumbersome. However, in Embodiment 8, since the anodes 23 are formed in the form of a belt, the step of bonding the anodes 23 to the solid high polymer electrolytic membrane 21 can be simplified, and, therefore, the productivity can be improved.

Embodiment 9

Figure 15:
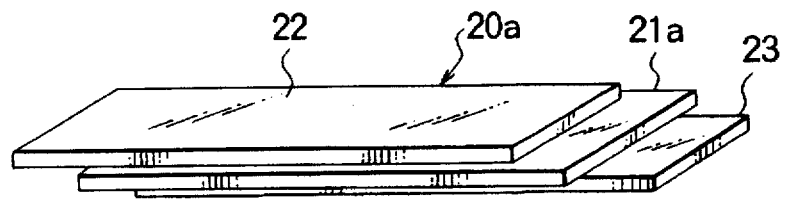
FIG. 15 is a perspective view showing an electrolytic membrane applied to a solid high polymer electrolytic module according to Embodiment 9 of the present invention.
Figure 16:
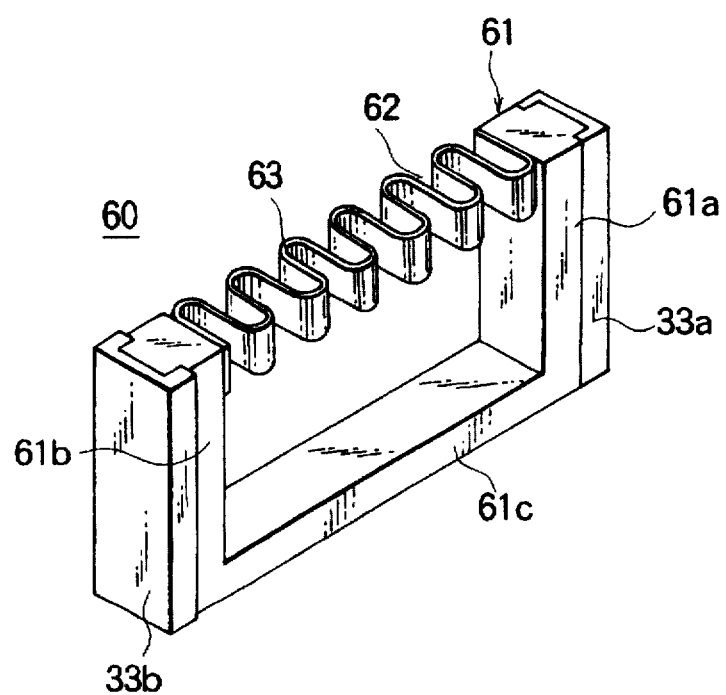
FIG. 16 is a perspective view showing a frame applied to the solid high polymer electrolytic module according to Embodiment 9 of the present invention.
Figure 17:
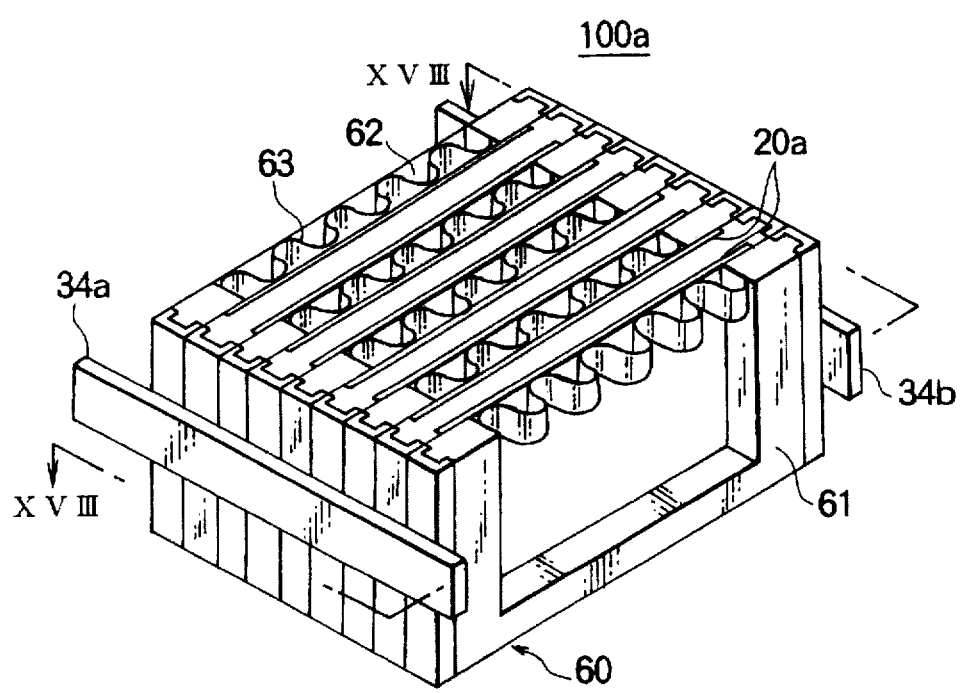
FIG. 17 is a partial assembly diagram showing the solid high polymer electrolytic module according to Embodiment 9 of the present invention.
Figure 18:
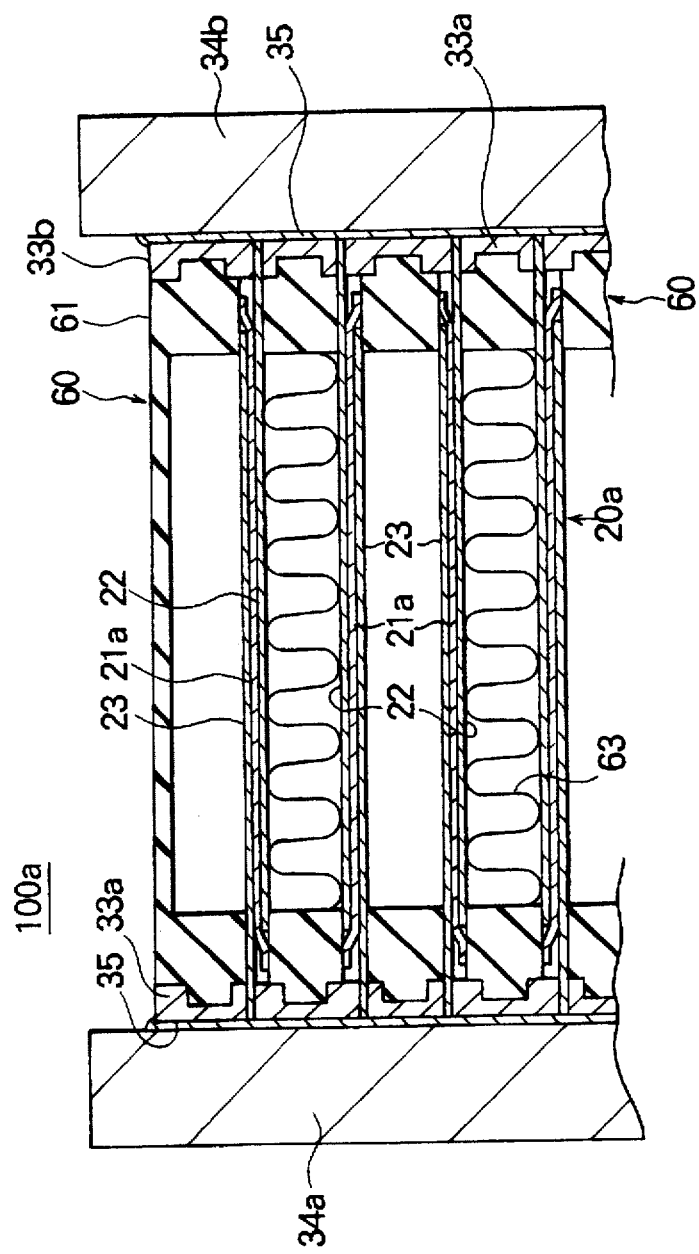
FIG. 18 is a sectional view showing the solid high polymer electrolytic module along a XVIII—XVIII line in FIG. 17.
Figure 19:
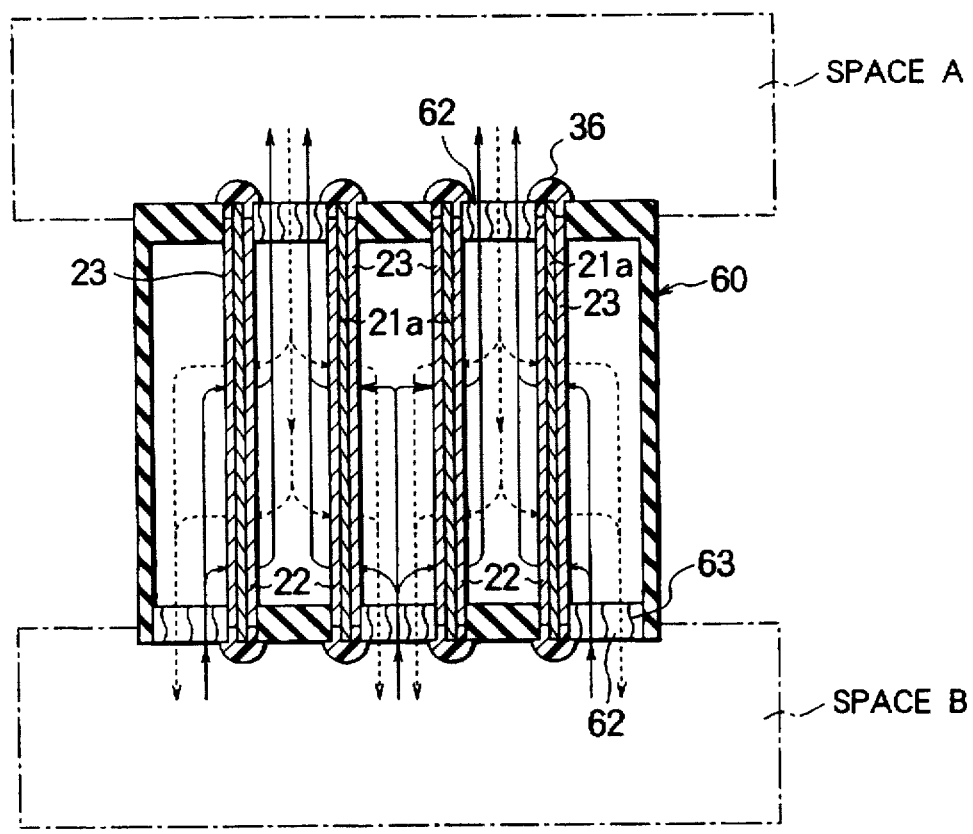
FIG. 19 is a view for explaining an operation of the solid high polymer electrolytic module according to Embodiment 9 of the present invention.

FIG. 15 is a perspective view showing an electrolytic membrane applied to a solid high polymer electrolytic module according to Embodiment 9 of the present invention, FIG. 16 is a perspective view showing a frame applied to the solid high polymer electrolytic module according to Embodiment 9 of the present invention, FIG. 17 is a partial assembly diagram showing the solid high polymer electrolytic module according to Embodiment 9 of the present invention, FIG. 18 is a sectional view showing the solid high polymer electrolytic module along a XVIII—XVIII line in FIG. 17, and FIG. 19 is a view for explaining an operation of the solid high polymer electrolytic module according to Embodiment 9 of the present invention.

Referring to FIG. 15, an electrolytic membrane 20a is constituted in such a manner that a pair of strip-shaped cathode 22 and strip-shaped anode 23 are bonded opposite to each other to both the surfaces of a strip-shaped solid high polymer electrolytic membrane 21a. The cathode 22 extends on one side of the solid high polymer electrolytic membrane 21a, and the anode 23 extends on the other side of the solid high polymer electrolytic membrane 21a. The solid high polymer electrolytic membrane 21s is formed to have a width slightly larger than that of each of the cathode 22 and the anode 23. Like the solid high polymer electrolytic membrane 21 described above, the solid high polymer electrolytic membrane 21a is formed by a NAFION membrane.

Referring to FIG. 16, a frame 60 is formed to have a U shape where one edge of a rectangular frame member 61 is removed, a ventilation member 63 is arranged at the opening side of the frame member 61 to constitute an opening 62. This ventilation member 63 is constituted by a wavy plate obtained by molding a resin such as a vinyl chloride resin or a metal plate into a corrugated form, thereby making it possible to circulate a gas between the inside and outside of the frame 60. The ventilation member 63 is formed to have a thickness equal to that of the frame member 61. As the ventilation member 63, any member through which a gas can pass may be used, and, for example, a ceramic plate having a honeycomb structure can also be used.

Feeding terminals 33a and 33b are formed on opposing edges 61a and 61b on both the sides of the opening 62 of the frame member 61, respectively. The feeding terminals 33a and 33b are formed from one surface side of the frame member 61 to the other surface side through the outer wall surfaces. In this case, the feeding terminal 33a is formed at a surface position which is almost the same as that of the frame member 61, and the feeding terminal 33b is formed to project from a surface of the frame member 61. The frame member 61 is manufactured by molding a resin such as an epoxy resin, an acrylic resin, or a vinyl chloride resin.

The frames 60 each constituted as described above are stacked while the electrolytic membrane 20a is interposed between the frames 60 such that the same poles are opposite to each other, and the frames 60 are changed in direction to make the directions of the openings 62 alternately opposite to each other.

At this time, two types of frames 60, i.e., a frame 60 in which the projection amount of the feeding terminal 33b is slightly smaller than the total thickness of the cathode 22 and the solid high polymer electrolytic membrane 21a and a frame 60 in which the projection amount of the feeding terminal 33b is slightly amount of the total thickness of the anode 23 and the solid high polymer electrolytic membrane 21a, are used. The frames 60 are arranged to be stacked in such a manner that the anode 23 is held between the feeding terminal 33a and the feeding terminal 33b whose projection amount is slightly smaller than the total thickness of the cathode 22 and the solid high polymer electrolytic membrane 21a, and the cathode 22 is held between the feeding terminal 33a and the feeding terminal 33b whose projection amount is slightly smaller than the total thickness of the anode 23 and the solid high polymer electrolytic membrane 21a.

The electrolytic membrane 20a having a stacked body constituted by the cathode 22, the solid high polymer electrolytic membrane 21a, and the anode 23 is held between a pair of adjacent frame members 61 in a press-contact state. At this time, since the ventilation member 63 is formed to have a thickness equal to that of the frame member 61, even at the opening 62, the electrolytic membrane 20a is held between the ventilation member 63 and a counter edge 61c of the frame member 61. The end portions of the cathode 22 and the anode 23 projecting from the solid high polymer electrolytic membrane 21a are held between a pair of adjacent feeding terminals 33a and 33b in a press-contact state, thereby establishing electric connection.

As shown in FIG. 18, the respective cathodes 22 of the electrolytic membrane 20a are electrically connected to feeding terminals on one side of the stacked body of the frames 60, and the anodes 23 are electrically connected to feeding terminals on the other side of the stacked body of the frames 60. A feeding bus 34a is arranged on one side of the stacked body of the frames 60, and a feeding bus 34b is arranged on the other side of the stacked body of the frames 60 so that a DC voltage can be applied across the cathodes 22 and the anodes 23 through the feeding terminals 33a and 33b. Conductive dye 35 is coated between the feeding buses 34a and 34b and the feeding terminals 33a and 33b. For this reason, even if a side surface of the stacked body of the frames 60 is made uneven, electric connection between the feeding buses 34a and 34b and the feeding terminals 33a and 33b can be reliably established. At this time, the conductive dye 35 also functions in such a manner that the feeding terminals 33a and 33b are electrically connected to the cathodes 22 and the anodes 23.

Note that the respective feeding terminals 33a and 33b and the feeding buses 34a and 34b may be connected by lead lines (not shown).

In this manner, a solid high polymer electrolytic module 100a in which spaces each having the upward opening 62 and formed between the opposing cathodes 22 and spaces each having the downward opening 62 and formed between the opposing anodes 23 are alternately formed can be obtained.

In this case, as shown in FIG. 19, a hardening resin 36 such as an ultraviolet hardening resin is coated on the contact surfaces of the stacked frames 60 or the outer edge surface of the stacked body and hardened to cut the flow passage between the space A on the cathode side and the space B on the anode side.

The action of the solid high polymer electrolytic module 100a according to Embodiment 9 will be described below with reference to FIG. 19.

The space A faces the upward openings 62 of the solid high polymer electrolytic module 100a, and the space B faces the downward openings 62 of the solid high polymer electrolytic module 100a. More specifically, the space A faces all the cathodes 22 of the electrolytic membrane 20a, and the space B faces all the anodes 63 of the electrolytic membrane 20a.

Therefore, when a DC voltage is applied across the cathodes 22 and the anodes 23 through the feeding buses 34a and 34b and the feeding terminals 33a and 33b, water generation reaction takes place on the cathode 22 side of the electrolytic membrane 20a, and electrolytic reaction of water takes place on the anode 23 side. Steam on the anode 23 side is electrolyzed to generate oxygen. In contrast to this, oxygen is consumed on the cathode 22 side to generate steam. More specifically, the steam on the anode 23 side apparently moves to the cathode 22 side, and the oxygen on the cathode 22 side apparently moves to the anode 23 side.

For this reason, the steam on the space B side flows into the frames 60 through the ventilation members 63 of the openings 62 and moves upward along a solid arrow. When the steam reaches the surfaces of the anodes 23, electrolysis occurs to produce oxygen. The produced oxygen moves downward along a dotted arrow to flow into the space B through the ventilation members 63 of the openings 62. On the other hand, the oxygen on the space A side flows into the frames 60 through the ventilation members 63 of the openings 62 and moves downward along a dotted arrow. When the oxygen reaches the cathodes 22, the oxygen reacts with hydrogen ions conducting through the electrolytic membrane 20a to produce steam. The produced steam moves upward along a solid arrow to flow into the space A through the ventilation members 63 of the openings 62. In this manner, the space B is dehumidified and becomes an environment rich in oxygen, and the space A is humidified and becomes an environment poor in oxygen.

Use of this phenomenon makes it possible to control the humidity of the spaces.

Therefore, as in Embodiment 9, the same effect as that of Embodiment 1 can be obtained.

According to Embodiment 9, the electrolytic membrane 20a held between the frames 60 is constituted in such a manner that a pair of strip-shaped cathode 22 and strip-shaped anode 23 are bonded opposite to each other to both the surfaces of the strip-shaped solid high polymer electrolytic membrane 21a. A smaller electrolytic membrane and small-scale equipment for forming an electrolytic membrane can be achieved compared with Embodiment 1 in which the electrolytic membrane 20 is constituted in such a manner that a pair of strip-shaped cathode 22 and strip-shaped anode 23 are bonded opposite to each other to both the surfaces of the belt-shaped solid high polymer electrolytic membrane 21.

Figure 20:
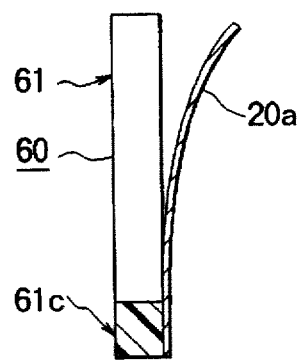
FIG. 20 is a sectional view for explaining a drawback occurring when an electrolytic membrane has warpage.

In this case, when the electrolytic membrane 20a having warpage shown in FIG. 20 is to be held between frames on which no ventilation member 63 is arranged, although the three sides of the electrolytic membrane 20a are mechanically fixed, the unfixed side is bent on the opening side, and a gap is formed between the frame and the electrolytic membrane 20a.

However, according to Embodiment 9, since the ventilation member 63 formed to have a thickness equal to that of the frame member 61 is arranged on an opening side of the frame member 61, when the electrolytic membrane 20a is held between the frames 60, even at the opening 62, the electrolytic membrane 20a is held between the ventilation member 63 and a counter edge 61c of the frame member 61 in a press-contact state. Even if warpage occurs in the electrolytic membrane 20a, the four sides of the electrolytic membrane 20a are mechanically fixed, and no gap between the frame 60 and the electrolytic membrane 20a is formed. The space A on the cathode side can be reliably shielded from the space B on the anode side, the arrangement of the electrolytic membranes 20a can be suppressed from being disturbed.

In each of the embodiments described above, when the ventilation member 63 is arranged on the opening side of a U-shaped frame member constituting a frame, in addition to the effects of these embodiments, the following effects can be obtained. That is, the space A on the cathode side can be reliably shielded from the space B on the anode side, and the arrangement of the electrolytic membranes 20a can be suppressed from being disturbed.

Embodiment 10

Figure 21:
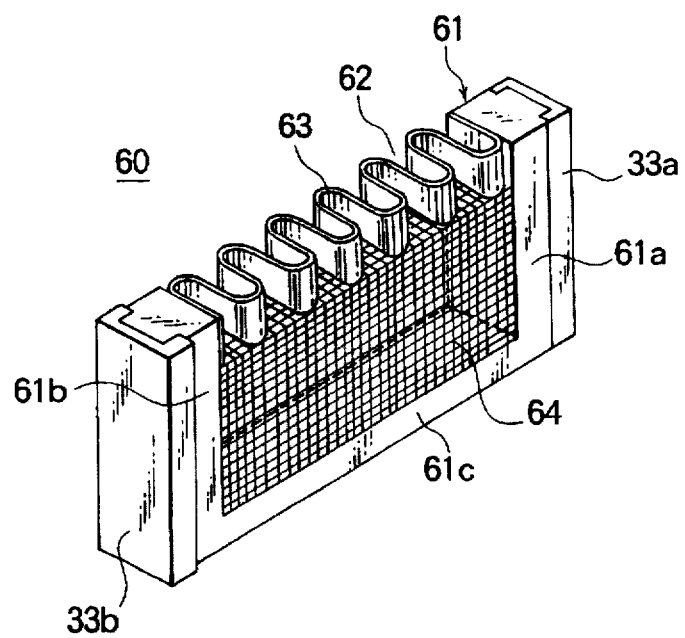
FIG. 21 is a perspective view showing a frame applied to a solid high polymer electrolytic module according to Embodiment 10 of the present invention.

In Embodiment 9 described above, a hollow portion is formed in the frame 60 surrounded by the frame member 61 and the ventilation member 63. In Embodiment 10, as shown in FIG. 21, a ventilation plate 64 serving as a ventilation through which a gas freely passes is arranged in the frame 60 surrounded by the frame member 61 and the ventilation member 63. The remaining arrangement of Embodiment 10 is the same as that of Embodiment 9.

In this case, the ventilation plate 64 has a thickness equal to that of the frame member 61 like the ventilation member 63, and a wavy plate obtained by molding a resin such as a vinyl chloride resin or a metal plate into a corrugated form is used as the ventilation plate 64.

In Embodiment 10, as in Embodiment 9 described above, the frames 60 are stacked while the electrolytic membrane 20a is interposed between the frames 60 such that the same poles are opposite to each other, and the frames 60 are alternately changed in direction to make the directions of the openings 62 alternately opposite to each other, thereby constituting a solid high polymer electrolytic module. For this reason, the outer edge portion of the electrolytic membrane 20a is held between the frame members 61 which are adjacent to each other and between the frame member 61 and the ventilation member 63 which are adjacent to each other in a press-contact state, and the inside of the electrolytic membrane 20a is held between the ventilation plates 64 which are adjacent to each other in a press-contact state.

Therefore, according to Embodiment 10, since the entire surface of the electrolytic membrane 20a can be mechanically fixed, the same effect as that in Embodiment 9 described above can be obtained. In addition, even if the solid high polymer electrolytic module of Embodiment 10 is applied to a system in which a pressure difference between the cathode 22 side and the anode 23 side is generated, stress acting on the electrolytic membrane 20a by the pressure difference is supported by the ventilation plates 64, and the electrolytic membrane 20a can be prevented from damage or deformation.

Although the ventilation plate 64 is constituted by a wavy plate molded into a corrugated form, a large number of through holes may be formed in the wavy plate. In this case, since a space formed by a pair of electrolytic membranes 20a and the frame member 61 is not partitioned, a gas in the space can smoothly flow.

Although a wavy plate molded a corrugated form is used as the ventilation plate 64, the ventilation plate 64 may be constituted to cause a gas to freely pass through the ventilation plate 64. For example, as the ventilation plate 64, a flat plate which is mold to have an outer diameter equal to that of the inside of the frame 60 surrounded by the frame member 61 and the ventilation member 63 and which has a large number of needle-like projections extending from both the surfaces of the flat plate may be used.

In each of the embodiments described above, when a ventilation plate 64 is arranged in the frame, in addition to the effects of these embodiments, an effect that the solid high polymer electrolytic module can also be applied to a system in which a pressure difference between the cathode 22 side and the anode 23 side is generated can be obtained.

Embodiment 11

Figure 22:
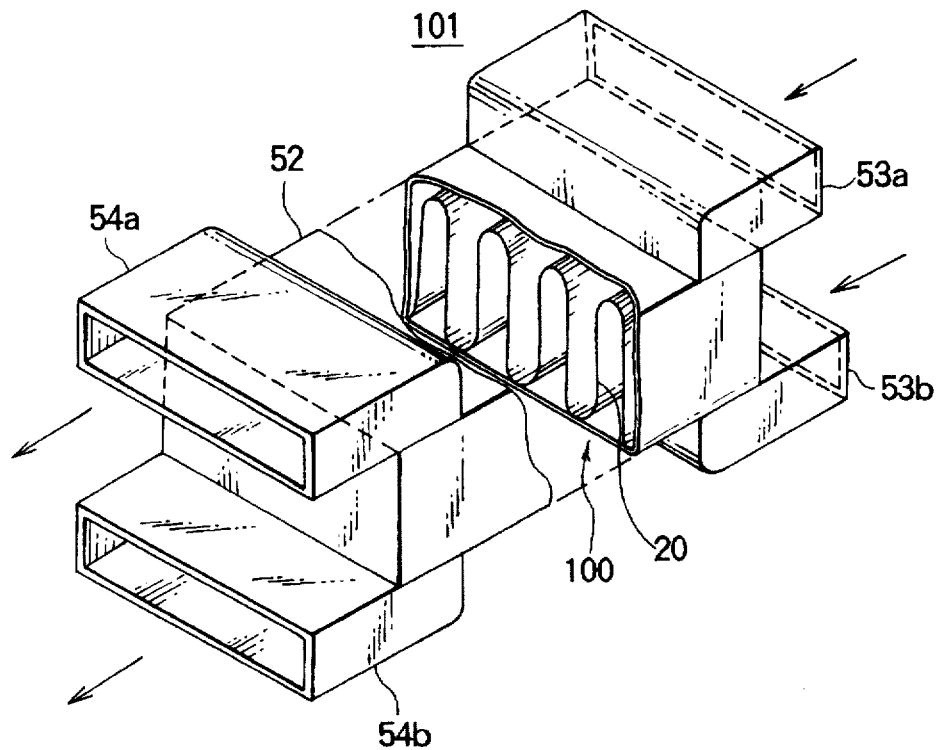
FIG. 22 is a partially cutaway perspective view showing the structure of a dehumidification apparatus according to Embodiment 11 of the present invention.
Figure 23:
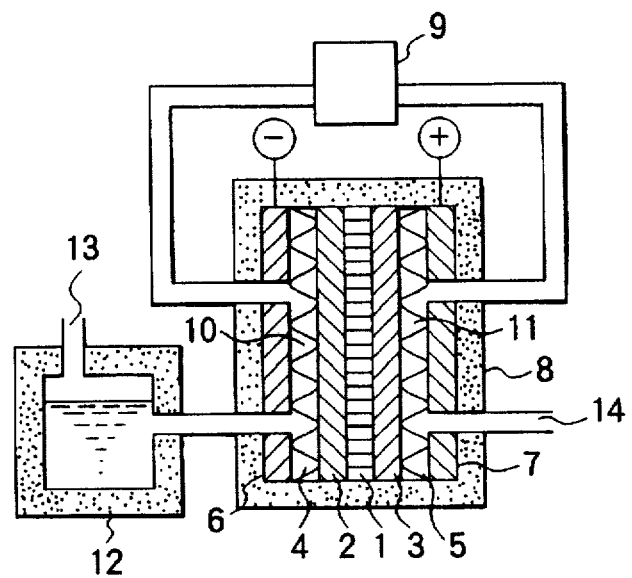
FIG. 23 is a sectional view showing a conventional solid high polymer electrolytic module.

FIG. 22 is a partially cutaway perspective view showing the schematic arrangement of a dehumidification apparatus according to Embodiment 11 of the present invention.

In a dehumidification apparatus 101, the solid high polymer electrolytic module 100 according to Embodiment 1 is stored in a housing 52, the inlet ports 53a and 53b for fluid and the exhaust ports 54a and 54b for fluid are arranged on both the ends of the housing 52. The solid high polymer electrolytic module 100 is stored in the housing 52 in such a manner that the opening 32 of the frame 30 where the anodes 23 are opposite to each other faces downward, and the opening 32 of the frame 30 where the cathodes 22 are opposite to each other faces upward to partition a space into upper and lower spaces. A first flow passage in which fluid flowing from the inlet port 53a is exhausted from the exhaust port 54a through the upper space is formed, and a second flow passage in which fluid flowing from the inlet port 53b is exhausted from the exhaust portion 54b through the lower space is formed. In addition, the solid high polymer electrolytic module 100 is arranged in such a manner that the stacking direction of the frames 30 is perpendicular to the first and second flow passages.

In the dehumidification apparatus 101 arranged as described above, the fluid flowing from the inlet ports 53a and 53b by an air-feeding means (not shown) is circulated in the first and second flow passages, the fluid is circulated along the electrode reaction surface of the electrolytic membrane 20. Therefore, movement of electrolytic products generated by electrode reaction is accelerated by forced convection on the electrode reaction surface, and movement of a materials generated by electrode reaction between two spaces separated from each other by the electrolytic membrane 20 is accelerated.

Therefore, according to Embodiment 11, the electrolytic efficiency of the solid high polymer electrolytic module 100 can be improved, and a dehumidification apparatus having excellent dehumidification performance can be obtained.

The dehumidification apparatus satisfactorily has at least one pair of inlet ports 53a and 53b and at least one pair of exhaust ports 54a and 54b.

In Embodiment 11, although the dehumidification apparatus is constituted by the solid high polymer electrolytic module 100 according to Embodiment 1, even if a solid high polymer electrolytic module according to another embodiment is used, the same effect as described above can be obtained.

In each of the embodiments described above, although a NAFION membrane having hydrogen ions as conductors is used as the solid high polymer electrolytic membrane 21, when an electrolytic module having a hydroxide ion conductivity is to be formed, a membrane consisting of anion exchange polymers in which fluorine-contained polymers have amino groups may be used in place of the NAFION membrane.

Since the above arrangement can be obtained according to this invention, the effects described below can be obtained.

According to the present invention, a solid high polymer electrolytic module comprises an electrolytic membrane in which a plurality of strip-shaped anodes are formed at a predetermined interval on one surface of a belt-shaped solid high polymer electrolytic membrane having hydrogen ions or hydroxide ions as conductors in a longitudinal direction and a plurality of strip-shaped cathodes are formed at a predetermined interval on the other surface of the solid high polymer electrolytic membrane in the longitudinal direction to be opposite to the anodes, a plurality of rectangular frames each constituted by an electric insulator having an opening on one side and stacked such that the openings alternately face upward and downward, and feeders for supplying electricity from a DC power supply to the electrolytic membrane, and the electrolytic membrane is folded at counter edges opposing the openings of the frames and causes the anode and cathode formed opposite to each other on both the surfaces of the solid high polymer electrolytic membrane to be held between the adjacent frames, thereby constituting a stereoscopically corrugated structure in a stacking direction of the frames. For this reason, a large electrolytic area can be formed in a small space, and a compact solid high polymer electrolytic module having a large capacity can be obtained.

According to the present invention, a solid high polymer electrolytic module comprises a plurality of electrolytic membranes in which strip-shaped anodes and strip-shaped cathodes are formed opposite to each other on both the surfaces of strip-shaped solid high polymer electrolytic membranes having hydrogen ions or hydroxide ions as conductors, a plurality of rectangular frames each constituted by an electric insulator having an opening on one side and stacked such that the openings alternately face upward and downward, and a feeder for supplying electricity from a DC power supply to the electrolytic membranes, and the plurality of electrolytic membranes are interposed between the frames such that the same poles of the anodes and cathodes are opposite to each other, thereby constituting a stereoscopically corrugated structure in a stacking direction of the frames. For this reason, in addition to the effects of the invention described above, the anode and the cathode can be bonded to the solid high polymer electrolytic membrane with a small heat-press surface, and equipment can be decreased in scale.

According to the present invention, a solid high polymer electrolytic module is constituted in such a manner that the solid high polymer electrolytic membrane is held between a pair of frames arranged such that the openings oppositely face upward and downward, both the ends of the electrolytic membrane are bonded to counter edges opposing the openings of the pair of frames to constitute a unit, the units are bonded in series with each other such that the same poles of anodes and cathodes are opposite to each other, and the electrolytic membrane is folded at the counter edges of the frames, thereby forming a stereoscopically corrugated structure in the stacking direction of the frames. For this reason, the electrolytic membrane and the frames constitute units, easy handling can be achieved, and workability of stacking can be improved, thereby improving productivity.

According to the present invention, a solid high polymer electrolytic module comprises an electrolytic membrane in which a belt-shaped anode is formed on one surface of a belt-shaped solid high polymer electrolytic membrane having hydrogen ions or hydroxide ions as conductors in a longitudinal direction and a plurality of strip-shaped cathodes are formed at a predetermined interval on the other surface of the solid high polymer electrolytic membrane to be opposite to the anode in the longitudinal direction, a plurality of rectangular frames each constituted by an electric insulator having an opening on one side and stacked such that the openings alternately face upward and downward, and a feeder for supplying electricity to the electrolytic membrane, and the electrolytic membrane is folded at counter edges opposing the openings of the frames and causes the anode and cathodes formed opposite to each other on both the surfaces of the solid high polymer electrolytic membrane to be held between the frames, thereby constituting a stereoscopically corrugated structure in a stacking direction of the frames. For this reason, in addition to the effects of the invention described above, the step of bonding the anode to the solid high polymer electrolytic membrane is simplified, thereby improving productivity.

According to the present invention, the anode is constituted by a titanium mesh-like structure subjected to surface treatment using a platinum-based metal. For this reason, the anode is not corroded by nascent oxygen generated at the anode, and long life can be achieved.

According to the present invention, the feeding terminals are formed on two opposing side edges adjacent to the sides having the openings of the frames through outer end faces of the side edges to be exposed to both front and rear surfaces, and when the frames are stacked, the feeding terminals of adjacent frames are electrically connected to each other, the anodes are electrically connected to the feeding terminals on one side of the stacked frames, and the cathodes are electrically connected to the feeding terminals on the other side of the stacked frames. For this reason, feeding systems for the cathodes and anodes can be simply constituted.

According to the present invention, the anode extends on one side of the solid high polymer electrolytic membrane in one of width directions of the solid high polymer electrolytic membrane, the cathode extends in the other of the width directions of the solid high polymer electrolytic membrane, an extending end portion of the anode is held between the feeding terminals on one side of adjacent frames, and an extending end portion of the cathode is held between the feeding terminals on the other side of adjacent frames, thereby electrically connecting the extending end portions to the feeding terminals, respectively. For this reason, a special member for electrically connecting the cathode and the anode to the feeding terminal is not necessary, the number of parts is reduced, and the structure is simplified, thereby achieving low cost and high productivity.

According to the present invention, the auxiliary feeding terminals arranged on a counter edge opposing the opening of the frame facing the cathode such that the auxiliary feeding terminals are exposed to both the front and rear surfaces and electrically connected to the feeding terminal on the other side of the frame, thereby electrically connecting the auxiliary feeding terminal to an end portion of the cathode. For this reason, voltage drop in an electrode surface direction of the cathode can be suppressed, and a decrease in electrolytic efficiency can be suppressed.

According to the present invention, an elastic member is inserted from outside into the counter edge through the electrolytic membrane, and the cathode is brought into tight contact with the auxiliary feeding terminal by an elastic force of the elastic member to be electrically connected to the auxiliary feeding terminal. For this reason, an electric contact resistance between the cathode and the auxiliary feeding terminal can be considerably reduced.

According to the present invention, a pair of feeding buses are arranged along both the side surfaces of the stacked frames, one of the feeding buses is electrically connected to the feeding terminal on one side of each frame, and the other of the feeding buses is electrically connected to the feeding terminal on the other side of each frame. For this reason, a feeding structure can be simplified, an electric power can be uniformly supplied to electrochemical cells, thereby achieving stability of a module operation.

According to the present invention, each frame is formed into a U shape by removing one edge from a rectangular frame member, and an opening side of the frame member from which the edge is removed is used as an opening. For this reason, the frame can be easily manufactured, thereby achieving low cost.

According to the present invention, a ventilation member through which a gas can freely pass and which has a thickness equal to that of the frame member is arranged on the opening side of the frame member. For this reason, in addition to the effects of the invention described above, the four sides of the electrolytic membrane can be mechanically fixed, and a space on the cathode side and a space on the anode side can be reliably shielded from each other.

According to the present invention, each frame is formed by forming at least one through hole in one edge of a rectangular frame member, and the through hole is used as an opening. For this reason, in addition to the effects of the invention described above, the frame can be improved on strength, and the solid high polymer electrolytic module can also be used in an application in which a high pressure acts.

According to the present invention, the ventilation materials through which a gas is freely circulated are arranged each hollow space of in the frames, and when the frames are stacked, the electrolytic membrane is held between the adjacent ventilation materials. For this reason, the electrolytic membrane is held between the ventilation materials in a press-contact state, and the solid high polymer electrolytic module can also be used in an application in which a pressure difference is generated between a space on the cathode side and a space on the anode side.

According to the present invention, a dehumidification apparatus comprises: a solid high polymer electrolytic module in which a plurality of rectangular frames each constituted by an electric insulator having an opening on one side are stacked such that the openings alternately face upward and downward, a belt-shaped electrolytic membrane in which a plurality of strip-shaped anodes and a plurality of strip-shaped cathodes are formed at a predetermined interval opposite to each other on both the surfaces of a belt-shaped solid high polymer electrolytic membrane having hydrogen ions or hydroxide ions as conductors in a longitudinal direction is folded at counter edges opposing the openings of the frames, the anodes and the cathodes formed opposite to each other on both the surfaces of the solid high polymer electrolytic membrane are held between the adjacent frames, the anodes are opposite to each other through each frame, the cathodes are opposite to each other through each frame, and the belt-shaped electrolytic membrane constitutes a stereoscopically corrugated structure in a stacking direction of the frames; and a housing for storing the solid high polymer electrolytic module, and the opening where the anodes are opposite to each other faces upward, the opening where the cathodes are opposite to each other faces downward, the solid high polymer electrolytic module is stored in the housing to partition a space in the housing into upper and lower spaces, inlet ports and exhaust ports are formed in both end portions of the housing in a direction perpendicular to the stacking direction of the frames to respectively communicate with the upper and lower spaces and to form flow passages for fluid along both corrugated wall surfaces of the electrolytic membrane. For this reason, electrolytic efficiency can be improved, and a dehumidification apparatus having excellent dehumidification performance can be obtained.

According to the present invention, a dehumidification apparatus comprises: a solid high polymer electrolytic module in which a plurality of rectangular frames each constituted by an electric insulator having an opening on one side are stacked such that the openings alternately face upward and downward, a plurality of electrolytic membranes in which strip-shaped anodes and strip-shaped cathodes are formed opposite to each other on both the surfaces of strip-shaped solid high polymer electrolytic membranes having hydrogen ions and hydroxide ions as conductors are interposed between the adjacent frames such that the same poles of the anodes and cathodes are opposite to each other, thereby constituting a stereoscopically corrugated structure a stacking direction of the frames; and a housing for storing the solid high polymer electrolytic module, and the opening where the anodes are opposite to each other faces downward, the opening where the cathodes are opposite to each other faces upward, the solid high polymer electrolytic module is stored in the housing to partition a space in the housing into upper and lower spaces, inlet ports and exhaust ports are formed in both end portions of the housing in a direction perpendicular to the stacking direction of the frames to respectively communicate with the upper and lower spaces and to form flow passages for fluid along both corrugated wall surfaces of the electrolytic membrane. For this reason, the same effects as those in the invention described above can be obtained.

According to the present invention, a dehumidification apparatus comprises: a solid high polymer electrolytic module in which a plurality of rectangular frames each constituted by an electric insulator having an opening on one side are stacked such that the openings alternately face upward and downward, an electrolytic membrane in which a belt-shaped anode is formed on one surface of a belt-shaped solid high polymer electrolytic membrane having hydrogen ions and hydroxide ions as conductors in a longitudinal direction and a plurality of strip-shaped cathodes are formed at a predetermined interval on the other surface of the solid high polymer electrolytic membrane in the longitudinal direction to be opposite to the anode is folded at counter edges opposing the openings of the frames, the anode and the cathodes formed opposite to each other on both the surfaces of the solid high polymer electrolytic membrane are held between the adjacent frames, the anodes are opposite to each other through each frame, the cathodes are opposite to each other through each frame, and the electrolytic membranes constitute a stereoscopically corrugated structure in a stacking direction of the frames; and a housing for storing the solid high polymer electrolytic module, and the opening where the anodes are opposite to each other faces downward, the opening where the cathodes are opposite to each other faces upward, the solid high polymer electrolytic module is stored in the housing to partition a space in the housing into upper and lower spaces, inlet ports and exhaust ports are formed in both end portions of the housing in a direction perpendicular to the stacking direction of the frames to respectively communicate with the upper and lower spaces and to form flow passages for fluid along both corrugated wall surfaces of the electrolytic membrane. For this reason, the same effects as those in the invention described above can be obtained.

According to the present invention, a method of manufacturing a solid high polymer electrolytic module in which a plurality of rectangular frames each constituted by an electric insulator having an opening on one side are stacked such that the openings alternately face upward and downward, a belt-shaped electrolytic membrane in which strip-shaped anodes and strip-shaped cathodes are formed at a predetermined interval opposite to each other on both the surfaces of a belt-shaped solid high polymer electrolytic membrane having hydrogen ions and hydroxide ions as carriers is folded at counter edges opposing the openings of the frames, the anodes and the cathodes formed opposite to each other on both the surfaces of the solid high polymer electrolytic membrane are held between the adjacent frames, the anodes are opposite to each other through each frame, the cathodes are opposite to each other through each frame, and the electrolytic membrane constitutes a stereoscopically corrugated structure in a stacking direction of the frames, comprises: the step forming the plurality of strip-shaped anodes at the predetermined interval on one surface of the belt-shaped solid high polymer electrolytic membrane in the longitudinal direction, and forming the plurality of strip-shaped cathodes at a predetermined interval on the other surface of the solid high polymer electrolytic membrane in the longitudinal direction to be opposite to the anodes to form the belt-shaped electrolytic membrane; and the step of holding the electrolytic membrane in the longitudinal direction with a tensile force, alternately pushing the counter edge sides of the frames from an anode side and a cathode side into portions between adjacent electrodes of the electrolytic membrane, and stacking the frames. For this reason, a solid high polymer electrolytic module can be assembled by an automatic line, and can be manufactured at a high productivity.

According to the present invention, a method of manufacturing a solid high polymer electrolytic module in which a plurality of rectangular frames each constituted by an electric insulator having an opening on one side are stacked such that the openings alternately face upward and downward, a belt-shaped electrolytic membrane in which strip-shaped anodes and strip-shaped cathodes are formed at a predetermined interval opposite to each other on both the surfaces of a belt-shaped solid high polymer electrolytic membrane having hydrogen ions and hydroxide ions as carriers is folded at counter edges opposing the openings of the frames, the anodes and the cathodes formed opposite to each other on both the surfaces of the solid high polymer electrolytic membrane are held between the adjacent frames, the anodes are opposite to each other through each frame, the cathodes are opposite to each other through each frame, and the electrolytic membrane constitutes a stereoscopically corrugated structure in a stacking direction of the frames, comprises: the step of forming the plurality of strip-shaped anodes at the predetermined interval on one surface of the belt-shaped solid high polymer electrolytic membrane in the longitudinal direction, and forming the plurality of strip-shaped cathodes at a predetermined interval on the other surface of the solid high polymer electrolytic membrane in the longitudinal direction to be opposite to the anodes to form a belt-shaped electrolytic membrane; the step of alternately bonding the frames onto anode surfaces and cathode surfaces such that the openings face one side of the longitudinal direction of the electrolytic membrane; and the step of folding the electrolytic membrane at the counter edges of the frames to stack the frames. For this reason, a solid high polymer electrolytic module can be assembled by an automatic line or a semi-automatic line, and can be manufactured at a high productivity.

What is claimed is:

1. A solid high polymer electrolytic module comprising:
   an electrolytic membrane in which an anode is formed on one surface of a belt-shaped solid high polymer electrolytic membrane having hydrogen ions or hydroxide ions as carriers in a longitudinal direction and a cathode is formed on the other surface of said solid high polymer electrolytic membrane in the longitudinal direction to be opposite to said anode;
   a plurality of rectangular frames each constituted by an electric insulator having an opening on one side and stacked such that the openings alternately ace upward and downward; and
   feeders for supplying electricity from a DC power supply to said electrolytic membrane,
   wherein said electrolytic membrane is folded at counter edges opposing said openings of said frames and causes said anode and cathode formed opposite to each other on both the surfaces of said solid high polymer electrolytic membrane to be held between said adjacent frames, thereby constituting a stereoscopically corrugated structure in a stacking direction of said frames.

2. A solid high polymer electrolytic module according to claim 1, wherein said anode is formed into a plurality of strip-shaped anodes which are arranged at a set interval on one surface of said solid high polymer electrolytic membrane in a longitudinal direction, and said cathode is formed into a plurality of strip-shaped cathodes which are arranged at a set interval on the other surface of said solid high polymer electrolytic membrane in the longitudinal direction to be opposite to said anodes.

3. A solid high polymer electrolytic module according to claim 1, wherein said anode is formed into a belt, and said cathode is formed into a plurality of strip-shaped cathodes which are arranged at a set interval on the other surface of said solid high polymer electrolytic membrane to be opposite to said anode in the longitudinal direction.

4. A solid high polymer electrolytic module according to claim 1, wherein said anode is constituted by a titanium mesh structure subjected to surface treatment using a platinum-based metal.

5. A solid high polymer electrolytic module according to claim 1, wherein said feeders comprise feeding terminals formed on two opposing side edges adjacent to the sides having said openings of said frames through outer end faces of the side edges to be exposed to both front and rear surfaces, when said frames are stacked, said feeding terminals of adjacent frames are electrically connected to each other, said anodes are electrically connected to said feeding terminals on one side of said stacked frames, and said cathodes are electrically connected to said feeding terminals on the other side of said stacked frames.

6. A solid high polymer electrolytic module according to claim 5, wherein said anode extends on one side of said solid high polymer electrolytic membrane in one of width directions of said solid high polymer electrolytic membrane, said cathode extends in the other of the width directions of said solid high polymer electrolytic membrane, an extending end portion of said anode is held between said feeding terminals on one side of adjacent frames, and an extending end portion of said cathode is held between said feeding terminals on the other side of adjacent frames, thereby electrically connecting the extending end portions to said feeding terminals, respectively.

7. A solid high polymer electrolytic module according to claim 5, wherein said feeders comprise auxiliary feeding terminals arranged on a counter edge opposing said opening of said frame facing said cathode such that said auxiliary feeding terminals are exposed to both the front and rear surfaces of said frame and electrically connected to said feeding terminal on the other side of said frame, thereby electrically connecting said auxiliary feeding terminal to an end portion of said cathode.

8. A solid high polymer electrolytic module according to claim 7, further comprising an elastic member inserted from outside into the counter edge through said electrolytic membrane, thereby bringing said cathode into tight contact with said auxiliary feeding terminal by an elastic force of said elastic member to be electrically connected to said auxiliary feeding terminal.

9. A solid high polymer electrolytic module according to claim 5, wherein said feeders comprise a pair of feeding buses arranged along both the side surfaces of said stacked frames, one of said feeding buses being electrically connected to said feeding terminal on one side of each frame, and the other of said feeding buses being electrically connected to said feeding terminal on the other side of each frame.

10. A solid high polymer electrolytic module according to claim 1, wherein each frame is formed into a U shape by removing one edge from a rectangular frame member, and an opening side of said frame member from which the edge is removed is used as said opening.

11. A solid high polymer electrolytic module according to claim 10, further comprising a ventilation member through which a gas can freely pass and which has a thickness equal to that of said frame member, wherein said ventilation member is arranged on the opening side of said frame member.

12. A solid high polymer electrolytic module according to claim 1, wherein each frame is formed by forming at least one through hole in one edge of a rectangular frame member, and the through hole is used as an opening.

13. A solid high polymer electrolytic module according to claim 1, further comprising ventilation materials through which a gas is freely circulated and which are arranged in each hollow space of said frames, when said frames are stacked, said electrolytic membrane is held between the adjacent ventilation materials.

14. A method of manufacturing a solid high polymer electrolytic module in which a plurality of rectangular frames each constituted by an electric insulator having an opening on one side are stacked such that said openings alternately face upward and downward, a belt-shaped electrolytic membrane in which strip-shaped anodes and strip-shaped cathodes are formed at a set interval opposite to each other on both the surfaces of a belt-shaped solid high polymer electrolytic membrane having hydrogen ions and hydroxide ions as carriers is folded at counter edges opposing said openings of said frames, said anodes and said cathodes formed opposite to each other on both the surfaces of said solid high polymer electrolytic membrane are held between said adjacent frames, said anodes are opposite to each other through each frame, said cathodes are opposite to each other through each frame, and said electrolytic membrane constitutes a stereoscopically corrugated structure in a stacking direction of said frames, comprising:

the step of forming said plurality of strip-shaped anodes at the set interval on one surface of said belt-shaped solid high polymer electrolytic membrane in the longitudinal direction, and forming said plurality of strip-shaped cathodes at a set interval on the other surface of said solid high polymer electrolytic membrane in the longitudinal direction to be opposite to said anodes to form said belt-shaped electrolytic membrane; and the step of holding said electrolytic membrane in the longitudinal direction with a tensile force, alternately pushing the counter edge sides of said frames from an anode side and a cathode side into portions between adjacent electrodes of said electrolytic membrane, and stacking said frames.

15. A method of manufacturing a solid high polymer electrolytic module in which a plurality of rectangular frames each constituted by an electric insulator having an opening on one side are stacked such that said openings alternately face upward and downward, a belt-shaped electrolytic membrane in which strip-shaped anodes and strip-shaped cathodes are formed at a set interval opposite to each other on both the surfaces of a belt-shaped solid high polymer electrolytic membrane having hydrogen ions and hydroxide ions as carriers is folded at counter edges opposing said openings of said frames, said anodes and said cathodes formed opposite to each other on both the surfaces of said solid high polymer electrolytic membrane are held between said adjacent frames, said anodes are opposite to each other through each frame, said cathodes are opposite to each other through each frame, and said electrolytic membrane constitutes a stereoscopically corrugated structure in a stacking direction of said frames, comprising:

the step of forming said plurality of strip-shaped anodes at the set interval on one surface of said belt-shaped solid high polymer electrolytic membrane in the longitudinal direction, and forming said plurality of strip-shaped cathodes at a set interval on the other surface of said solid high polymer electrolytic membrane in the longitudinal direction to be opposite to said anodes to form a belt-shaped electrolytic membrane;

the step of alternately bonding said frames onto anode surfaces and cathode surfaces such that said openings face one side of the longitudinal direction of said electrolytic membrane; and the step of holding said electrolytic membrane at the counter edges of said frames to stack said frames.

* * * * *